United States Patent
Han et al.

(10) Patent No.: US 9,137,797 B2
(45) Date of Patent: Sep. 15, 2015

(54) TECHNIQUES TO MANAGE HETEROGENOUS CARRIER TYPES

(71) Applicant: Intel Corporation, Santa Clara, CA (US)

(72) Inventors: Seunghee Han, Anyangshi (KR); Alexei Davydov, Nizhy Novgorod Niz (RU); Hong He, Beijing (CN); Shafi Bashar, Santa Clara, CA (US); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,442

(22) PCT Filed: May 17, 2013

(86) PCT No.: PCT/US2013/041676
§ 371 (c)(1),
(2) Date: Jun. 26, 2013

(87) PCT Pub. No.: WO2013/180991
PCT Pub. Date: Dec. 15, 2013

(65) Prior Publication Data
US 2015/0085833 A1    Mar. 26, 2015

Related U.S. Application Data

(60) Provisional application No. 61/653,369, filed on May 30, 2012, provisional application No. 61/768,330, filed on Feb. 22, 2013.

(51) Int. Cl.
*H04W 4/00* (2009.01)
*H04J 11/00* (2006.01)
(Continued)

(52) U.S. Cl.
CPC ....... *H04W 72/0453* (2013.01); *H04J 11/0069* (2013.01); *H04L 5/0051* (2013.01); *H04W 4/00* (2013.01); *H04W 56/00* (2013.01)

(58) Field of Classification Search
CPC ................ H04L 1/0026; H04L 1/0027; H04L 25/03343; H04L 2025/03426; H04L 2025/03808; H04L 5/001; H04L 5/0023; H04L 5/0053; H04L 5/0057; H04L 1/0028; H04L 1/0031; H04L 5/0007; H04L 1/0029; H04L 1/06
See application file for complete search history.

(56) References Cited

U.S. PATENT DOCUMENTS 8,824,404 B2 *  9/2014  Ratasuk et al. ............... 370/329
8,873,467 B2 * 10/2014  Dinan .......................... 370/328
(Continued)

OTHER PUBLICATIONS

International Search Report received for PCT Patent Application No. PCT/US2013/041676, mailed Aug. 28, 2013, 14 pages.
(Continued)

*Primary Examiner* — Ayaz Sheikh
*Assistant Examiner* — Debebe Asefa
(74) *Attorney, Agent, or Firm* — Kacvinsky Daisak Bluni PLLC

(57) ABSTRACT

Techniques to manage heterogeneous carrier types are described. User equipment may comprise a processor circuit and a network control component for execution on the processor circuit to locate a synchronization signal (SS) and a cell-specific reference signal (CRS) in a physical resource block (PRB) pair of a long term evolution (LTE) system, the PRB pair having a physical signal pattern for a first carrier type, the physical signal pattern for the first carrier type to have a same number of defined positions between the SS and the CRS within the PRB pair as a physical signal pattern for a second carrier type. Other embodiments are described and claimed.

23 Claims, 17 Drawing Sheets

*Wireless System 100*

(51) Int. Cl.
*H04L 5/00* (2006.01)
*H04W 56/00* (2009.01)
*H04W 72/04* (2009.01)

(56) References Cited

U.S. PATENT DOCUMENTS

| | | |
|---|---|---|
| 2011/0081913 A1 | 4/2011 | Lee et al. |
| 2011/0149894 A1 | 6/2011 | Luo et al. |
| 2013/0039268 A1* | 2/2013 | Blankenship et al. ........ 370/328 |
| 2014/0119207 A1* | 5/2014 | Yamada ........................ 370/252 |

OTHER PUBLICATIONS

Samsung, "Synchronization signal mapping for the new carrier type", 3GPP TSG RAN WG1 Meeting #68bis, R1-121617, Jeju, Korea, Mar. 26-30, 2012.
Intel Corporation, "Discussions on Reference Symbol Design for New Carrier Types", 3GPP TSG RAN WG1 Meeting 68bis. R1-121532, Jeju, Korea, Mar. 26-30, 2012.
Qualcomm Incorporated, "PSS/SSS for New Carriers", 3GPP TSG RAN WG1, Meeting 68bis. R1-121549, Jeju, Korea, Mar. 26-30, 2012.

* cited by examiner

700

RECEIVE A RADIO FRAME AT USER EQUIPMENT (UE) OVER A DOWNLINK CHANNEL OF A LONG TERM EVOLUTION (LTE) NETWORK, THE RADIO FRAME TO COMPRISE A SUBFRAME WITH A PHYSICAL RESOURCE BLOCK (PRB) PAIR, THE PRB PAIR TO HAVE A PHYSICAL SIGNAL PATTERN OF A FIRST CARRIER TYPE OR A SECOND CARRIER TYPE
702

SEARCH FOR A SYNCHRONIZATION SIGNAL (SS) AT A POSITION WITHIN THE PRB PAIR, THE SS COMPRISING A PRIMARY SS (PSS) OR A SECONDARY SS (SSS)
704

LOCATE A CELL-SPECIFIC REFERENCE SIGNAL (CRS) AT ANOTHER POSITION WITHIN THE PRB PAIR BASED ON THE POSITION OF THE SS, THE POSITIONS SEPARATED BY A SAME DEFINED NUMBER OF POSITIONS WITHIN THE PRB PAIR WHETHER THE PHYSICAL SIGNAL PATTERN IS OF THE FIRST CARRIER TYPE OR THE SECOND CARRIER TYPE
706

MEASURE A POWER LEVEL OF THE CRS
708

GENERATE A SYNCHRONIZATION SIGNAL (SS) AND A CELL-SPECIFIC REFERENCE SIGNAL (CRS)
902

MAP THE SS AND THE CRS TO A PHYSICAL RESOURCE BLOCK (PRB) PAIR ACCORDING TO A PHYSICAL SIGNAL PATTERN FOR A FIRST CARRIER TYPE OR A SECOND CARRIER TYPE, THE PHYSICAL SIGNAL PATTERN FOR THE FIRST CARRIER TYPE TO HAVE A SAME NUMBER OF DEFINED POSITIONS BETWEEN THE SS AND THE CRS WITHIN THE PRB PAIR AS A PHYSICAL SIGNAL PATTERN FOR THE SECOND CARRIER TYPE
904

SEND THE MAPPED PRB PAIR IN A SUBFRAME OF A RADIO FRAME OVER A DOWNLINK CHANNEL OF A LONG TERM EVOLUTION (LTE) NETWORK
906

FIG. 9

Configuration Table 1500

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TECHNIQUES TO MANAGE HETEROGENOUS CARRIER TYPES

RELATED CASES

This application claims priority to United States Provisional Patent Application No. 61/653,369 filed on May 30, 2012, and U.S. Provisional Patent Application No. 61/768,330 filed on Feb. 22, 2013, both of which are hereby incorporated by reference in their entirety.

BACKGROUND

Fourth-generation (4G) mobile broadband based on the Third Generation Partnership Project (3GPP) Long Term Evolution (LTE) radio access technology is rapidly developing. Recent evolutions of the 3GPP standards introduce a new carrier type with minimized control channel overhead and reference signals. The new carrier type, however, is not backwards compatible with legacy carrier types and therefore does not support certain transmission modes. This incompatibility may cause spectral inefficiency, inter-cell interference, and increased power consumption for mobile devices.

BRIEF DESCRIPTION OF THE DRAWINGS

FIG. 7 illustrates an embodiment of a logic flow for a UE.
FIG. 9 illustrates an embodiment of a logic flow for a base station.
FIG. 15 illustrates an embodiment of a configuration table.

DETAILED DESCRIPTION

Figure 1:
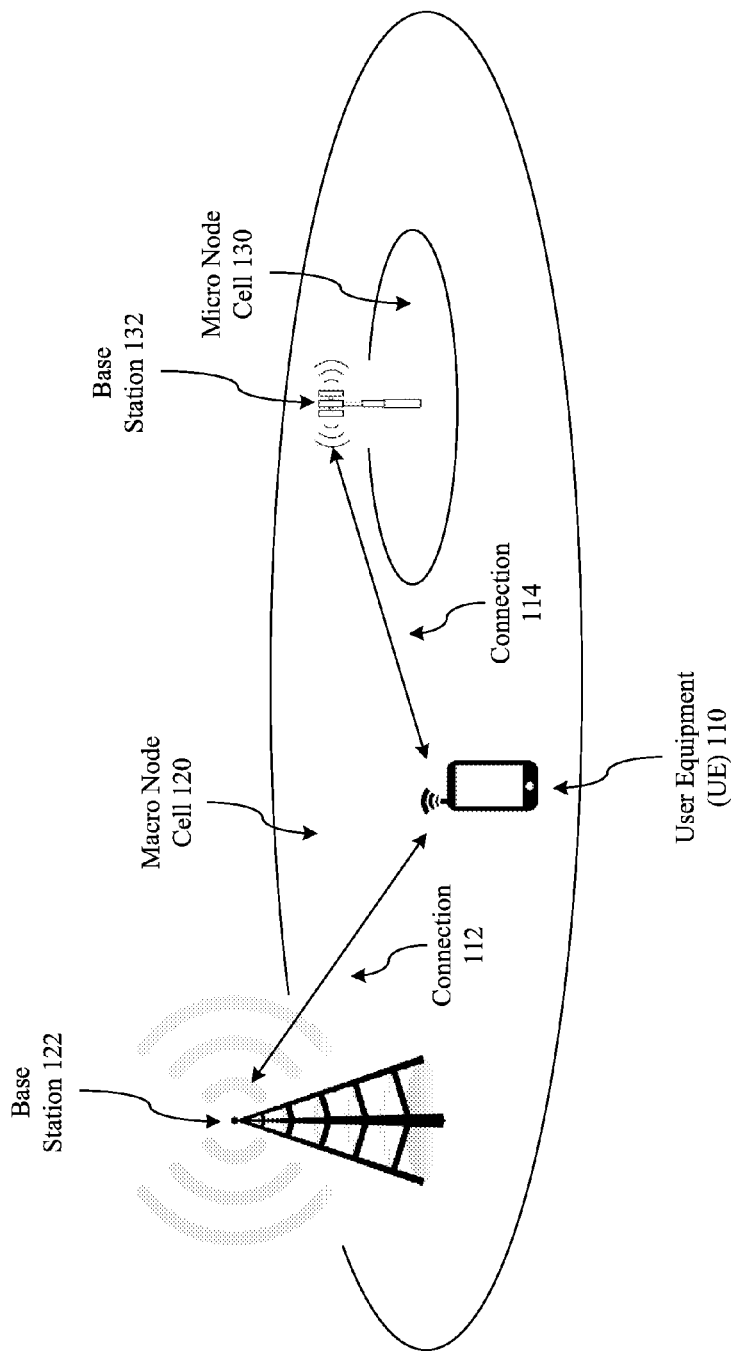
FIG. 1 illustrates an embodiment of a wireless system.

Various embodiments are related to wireless communications systems. Some embodiments are related to a multicarrier orthogonal frequency division multiplexing (OFDM) system, such as a 3GPP LTE system, for example. In general, embodiments may improve transmission and reception of control information and data information in a multicarrier OFDM system.

A multicarrier OFDM system may utilize different types of carriers. Each carrier type may be designed to convey different types of control information and data information. As new carrier types are added, such as through evolution of 3GPP LTE standards, many are backwards compatible to legacy user equipment (UE) sharing the same spectrum bands. However, the backward compatibility may introduce additional overhead and reduce air interface spectral efficiency.

LTE Releases 11 and 12 introduce a new carrier type sometimes referred to herein as a "new carrier type" or "lean carrier type." The lean carrier type complements legacy carrier types but is not backwards compatible. In general, the lean carrier type is designed to reduce control channel overhead in a downlink channel. Further, the lean carrier type may also be switched on or off based on load, thereby leading to enhanced power efficiency.

The lean carrier type may be particularly useful for smaller low power nodes co-located with larger high power nodes. A lower power node may provide high capacity and enhanced users data rates locally (e.g., indoor and outdoor hotspot positions), while a higher power node provides reliable wide-area coverage. For instance, a macro node cell may utilize a legacy carrier type to connect to a UE, while a micro node cell may utilize the lean carrier type to connect to the same UE. This leads to a potential scenario of dual-connectivity, where the UE maintains a simultaneous connection to a macro node cell and a micro node cell. In such cases, the legacy carrier type may be used for system information and basic control signaling, while the lean carrier type can be used for high-capacity data transmissions. This is merely an example of potential use scenarios for the lean carrier type, and others exist as well.

One way that the lean carrier type can reduce control channel overhead is by carrying certain reference signals at a reduced periodicity, such as a cell-specific reference signal (CRS), for example. A UE may use a CRS for various purposes, such as mobility measurements, synchronization, and channel estimation for demodulation, among others. A legacy carrier type (e.g., a carrier type other than a new carrier type or lean carrier type) typically transmits a CRS on certain resources in every physical resource block (PRB) pair and every subframe of a radio frame. As a result, transmission circuitry at a base station needs to stay active for a significant fraction of time. Further, the "always on" nature of cell-specific reference signals causes interference to neighbor cells even when no data is transmitted. For these and other reasons, the lean carrier type is designed to transmit a CRS in select subframes of a radio frame (e.g., subframes 0 and 5) at defined periodic intervals in order to increase the potential for lower network energy consumption and reduced inter-cell interference.

As an addition or alternative to cell-specific reference signals, the lean carrier type may also convey UE-specific or demodulation reference signals (DMRS). Unlike a CRS, UE-specific reference signals are transmitted on certain resources only within PRB pairs used for a data channel.

Although the lean carrier type attempts to reduce control channel overhead, it does convey a certain amount of control information also carried by legacy carrier types. For instance, the lean carrier type may transmit synchronization signals, such as a primary synchronization signal (PSS) and a secondary synchronization signal (SSS). A UE may use the PSS to acquire symbol timing and cell identification related information. A UE may use the SSS to acquire radio frame synchronization and cell identification group-related information.

One major problem associated with the lean carrier type conveying physical signals such as different synchronization signals and reference signals, such as a PSS, SSS, CRS and DMRS, is potential collisions with other radio frames. For instance, a same set of resource elements for a resource block may be used to convey the PSS/SSS and DMRS. In LTE Release 8/9/10, to avoid collisions, a physical downlink shared channel (PDSCH) with a DMRS is not scheduled for a resource block within 6 PRB pairs for the subframes transmitting a PSS/SSS. In the resource blocks without a DMRS, the PDSCH in conjunction with CRS for demodulation can be scheduled. However, this solution does not work with the lean carrier type since there is only partial use of a CRS. Therefore a technique to avoid collisions is needed in order to schedule the PDSCH for the lean carrier type.

One potential solution to avoid collisions between the PSS/SSS and the DMRS conveyed by the lean carrier type is to shift the PSS/SSS to other resource elements (e.g., OFDM symbols) within a PRB pair. Although this reduces the collision problem, shifting the PSS/SSS creates a new problem for a legacy UE attempting to detect reference signals on the lean carrier type. For legacy carrier types, a PSS/SSS is placed a defined number of positions from a CRS in a given PRB pair, and a legacy UE utilizes the defined number of positions to locate the CRS. To perform radio resource management (RRM) measurements for cell search-related operations, a legacy UE first attempts to locate a PSS/SSS, and then uses the location of the PSS/SSS and the defined number of positions to find a location for a CRS. The legacy UE measures the CRS to generate a reference signal received power (RSRP) parameter and/or a reference signal received quality (RSRQ) parameter. Cell selection and handoff operations are then performed using the RSRP and RSRQ parameters. By shifting the PSS/SSS to other OFDM symbols within a PRB pair, however, a legacy UE cannot locate the CRS as it is no longer a known distance from the PSS/SSS. This may significantly degrade or prevent RRM measurements, cell selection operations, and hand off operations, and other operations dependent on the CRS.

To solve these and other problems, embodiments attempt to resolve collisions between reference signals conveyed in a same resource element of a resource block of a lean carrier type, while still allowing a legacy UE to detect references signals on the lean carrier type in an agnostic manner. In one embodiment, for example, the PSS/SSS and the CRS are scheduled on a lean carrier type according to a physical signal pattern that maintains a defined distance between the PSS/SSS and the CRS that is the same or similar to a physical signal pattern used by a legacy carrier type. The PSS/SSS and the CRS are both shifted a same number of positions within a PRB pair of the lean carrier type, thereby maintaining a same number of defined positions between the PSS/SSS and the CRS in a PRB pair as in legacy carrier types. The shifting may include physical signal pattern shifting and/or scrambled sequence value shifting. Any physical signal pattern may be used for the lean carrier type as long as the relative distance between the PSS/SSS and CRS is maintained.

In addition to resolving collisions in an agnostic manner, embodiments also implement a physical signal pattern that schedules a PSS/SSS and a CRS in a same set of subframes of a radio frame. For instance, if a PSS/SSS has a periodicity of 5 milliseconds (ms), and assuming each subframe has a time period of 1 ms, then the PSS/SSS will appear every 5 subframes. Embodiments ensure that the CRS has the same periodicity and timing so that it occurs in the same subframes as the PSS/SSS. This allows a greater number of subframes without a PSS/SSS and CRS to be turned off to conserve energy.

When attempting to efficiently transmit the physical signals in particular subframes of a radio frame, it is important that a particular physical signal pattern used for a given cell differs from other cells to reduce potential collisions and inter-cell interference. A given physical signal pattern may be assigned to a given cell in a number of different ways, including explicit assignment communicated via radio resource control (RRC) signaling, or implicit assignment based on a physical cell identifier (PCI) for a cell. In the latter case, a physical signal pattern may be mathematically derived using a defined function that produces the physical signal pattern based on the PCI. A more detailed description of assignment of physical signal patterns to cells is provided with reference to FIGS. 10-15.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of a wireless system 100. As shown in FIG. 1, wireless system 100 may comprise any type of wireless system, such as a wireless personal area network (WPAN), wireless local area network (WLAN), wireless metropolitan area network (WMAN), a wireless wide area network (WWAN), and so forth. It may be appreciated that wireless system 100 of FIG. 1 is merely one type of wireless network showing a certain number of the components of wireless system, and the scope of the claimed subject matter is not limited in these respects.

The wireless system 100 may implement various wireless mobile broadband technologies. Wireless mobile broadband technologies may include any wireless technologies suitable for use with mobile devices, such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.11 and 802.16 standards, 3rd Generation Partnership Project (3GPP) Long Term Evolution (LTE) and LTE-Advanced (LTE ADV) standards (e.g., LTE Releases 8-12), and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, and so forth. The embodiments are not limited in this context.

In one embodiment, for example, the wireless system 100 may comprise a multicarrier OFDM system compliant with various 3GPP LTE and LTE ADV standards, such as the 3GPP LTE Evolved UMTS Terrestrial Radio Access Network (E-UTRAN), Universal Terrestrial Radio Access (E-UTRA) and LTE ADV Radio Technology 36 Series of Technical Specifications, particularly TS 36.211 and TS 36.213, (collectively "3GPP LTE Specifications"). Although some embodiments may be described as a 3GPP LTE Specifications system by way of example and not limitation, it may be appreciated that other types of communications systems may be implemented as various other types of mobile broadband communications systems and standards. The embodiments are not limited in this context.

Consistent with the 3GPP LTE Specifications, the wireless system 100 demonstrates densification of a cellular network by using complementary lower power micro nodes with higher power macro nodes. A macro node cell 120 may include a base station 122. A micro node cell 130 may be located within a transmission envelope of the base station 122. Although FIG. 1 illustrates a single micro node cell 130 within a single macro node cell 120, it may be appreciated that any number of single micro node cells 130 may be located within the macro node 120, and any number of macro node cells 120 may be part of the wireless system 100. Furthermore, although certain embodiments are described using macro node cells and micro node cells, the embodiments may be used in cellular radiotelephone systems utilizing only macro node cells or micro node cells. Embodiments are not limited in this context.

The wireless system 100 may utilize a heterogeneous mix of different cellular network equipment. The macro node cell 120 may utilize cellular infrastructure equipment capable of transmitting information across a wider area. The micro node cell 130 may utilize cellular infrastructure equipment capable of transmitting area within a smaller area relative to the macro node cell 120, such as indoor and outdoor "hotspot" locations. The micro node cell 130 may provide high capacity and enhanced user data rates locally, while the macro node cell 120 provides reliable wide-area coverage. In various embodiments, one or both of base stations 122, 132 may be implemented as evolved node B (eNB) devices. In some cases, the base stations 122, 132 may have a wired connection, such as fiber or co-axial cables, to coordinate operations. The embodiments are not limited in this context.

The wireless system 100 may further include user equipment (UE) 110, such as a mobile terminal or mobile station. Other examples for the UE 110 may be described with reference to device 1700 in FIG. 17. The UE 110 may be equipped to provide dual-connectivity, where the UE 110 can maintain a connection 112 to the base station 122 of the macro node cell 120, and a connection 114 to the base station 132 of the micro node cell 130. Connections 112, 114 may be established simultaneously or one at a time. When capable of simultaneous connections, the UE 110 may use connection 112 for system information and basic control signaling, and connection 114 for high-capacity data transmissions, for example.

In various embodiments, connections 112, 114 may utilize different carrier types. In one embodiment, the connection 114 may utilize a first carrier type, while the connection 112 may utilize a second carrier type. In one embodiment, the connection 114 may utilize a second carrier type, while the connection 112 may utilize a first carrier type. In one embodiment, connections 112, 114 may use a combination of first and second carrier types. Embodiments may use other carrier types as well. Embodiments are not limited in this context.

A first carrier type may comprise any carrier type suitable for use with shorter transmission ranges and lower control overhead associated with the micro node cell 130 and/or the base station 132. The shorter transmission ranges and lower control overhead may be measured relative to the longer transmission ranges and higher control overhead associated with the macro node cell 120 and/or the base station 122. In one embodiment, for example, the first carrier type may comprise a lean carrier type as defined by LTE Releases 11, 12 (also referred to herein as a "new carrier type"). The embodiments are not limited in this context.

A second carrier type may comprise any carrier type suitable for use with longer transmission ranges and higher control overhead associated with the macro node cell 120 and/or the base station 122. The longer transmission ranges and higher control overhead may be measured relative to the shorter transmission ranges and lower control overhead associated with the micro node cell 130 and/or the base station 132. In one embodiment, for example, the second carrier type may comprise any existing carrier type as defined by the 3GPP LTE Specifications, excluding the lean carrier type (or new carrier type) as defined by LTE Releases 11, 12, with the second carrier type also referred to herein as a "legacy carrier type."

In addition to, or as an alternative of, length of transmission ranges and amount of control overhead to differentiate between a first and second carrier types, another differentiating characteristic may be backwards compatibility. In one embodiment, for example, a first carrier type may be a non-backward compatible carrier (NB CC) type, and a second carrier type may be a backward compatible carrier (BCC) type. A BCC type may comprise a carrier type that may be used with previous versions of a same or similar carrier type, such as those used with a legacy system or previously defined wireless standard. For instance, a carrier type for a 3GPP LTE Release 12 device designed for use by a 3GPP LTE Release 8 device may be considered a BCC type, while a carrier type for 3GPP LTE Release 12 device not designed for use by a 3GPP LTE Release 8 device may be considered a NBCC type.

Although legacy carrier types do not include the new carrier type for purposes of this description, it may be appreciated that in some cases connections 112, 114 may use a combination of the new carrier type and the legacy carrier types, such as when performing carrier aggregation operations or attempting to minimize interference of cell-specific reference signals at cell edges, for example. The embodiments are not limited in this context.

Figure 2:
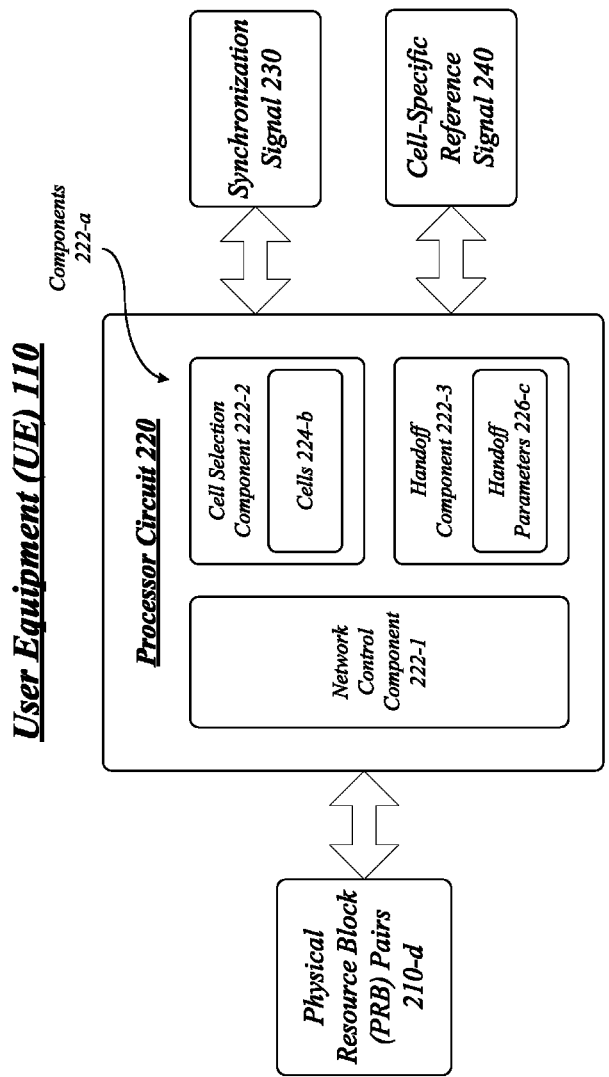
FIG. 2 illustrates an embodiment of user equipment (UE).

FIG. 2 illustrates an exemplary block diagram for the UE 110. Although the UE 110 shown in FIG. 2 has a limited number of elements in a certain topology, it may be appreciated that the UE 110 may include more or less elements in alternate topologies as desired for a given implementation.

The UE 110 may comprise any electronic device having a processor circuit 220 arranged to execute one or more software (or logic) components 222-*a*. It is worthy to note that "a" and "b" and "c" and similar designators as used herein are intended to be variables representing any positive integer. Thus, for example, if an implementation sets a value for a=5, then a complete set of software components 222-*a* may include components 222-1, 222-2, 222-3, 222-4 and 222-5. The embodiments are not limited in this context.

As shown in FIG. 2, the UE 110 may comprise three components, including a network control component 222-1, a cell selection component 222-2, and a handoff component 222-3. More or less components 222-*a* may be implemented in other embodiments, including those typically found in a UE. A more detailed block diagram of an electronic device suitable for the UE 110 may be shown as device 1700 in FIG. 17.

The UE 110 may comprise the processor circuit 120. The processor circuit 120 may be generally arranged to execute the software components 122-*a*. The processing circuit 120 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3®, Core i5®, Core i7®, Itanium®, Pentium®, Xeon®, XScale®, and Atom® processors; and similar processors. Dual microprocessors, multi-core processors, and other multi-processor architectures may also be employed as the processing unit 120.

The UE 110 may comprise a network control component 122-1. In one embodiment, the network control component 122-1 may be arranged for execution by the processor circuit 120, or alternatively, be implemented as stand-alone circuitry (e.g., an application specific integrated circuit or field programmable gate array). The network control component 122-1 may be generally arranged to detect control information (e.g., reference signals) from radio frames of a downlink channel, such as in radio frames transmitted from the base stations 122, 132 to the UE 110. A radio frame typically comprises multiple subframes, with each subframe having multiple resource elements, such as one or more physical resource block (PRB) pairs 210-*d*.

In one embodiment, the network control component 122-1 may receive a PRB pair 210-*d*, and locate a synchronization signal (SS) 230 and a cell-specific reference signal (CRS) 240 in the PRB pair 210-1 of the wireless system 100. Examples of a SS 230 may include without limitation a primary synchronization signal (PSS) and a secondary synchronization signal (SSS), among others. It is worthy to note that although certain embodiments are described using the CRS 240 by way of example and not limitation, it may be appreciated that other reference signals similar to the CRS 240 may be used as well. For example, in some LTE implements cell-specific reference signals, which were commonly used by the UE 110 to synchronize with the base stations 122, 132, are removed. For synchronization purposes, a new reference signal is added that is based on a CRS, which is sometimes referred to as an extended synchronization signal (eSS). Embodiments are not limited to the above examples.

A PRB pair 210-*d* may have a physical signal pattern of different types. In one embodiment, for example, a PRB pair 210-*d* may have a physical signal pattern of a first carrier type. The physical signal pattern of the first carrier type may have a same number of defined positions between the SS 230 and the CRS 240 within the PRB pair 210-*d* as a physical signal pattern for a second carrier type. In other words, a physical signal pattern for a first carrier type and a physical signal pattern for a second carrier type may both include the SS 230 and the CRS 240, with positions for the SS 230 and the CRS 240 at a same defined distance from each other within a given PRB pair 210-*d*. Physical signal patterns of a first carrier type and a second carrier type may be described in more detail with reference to FIGS. 3-6.

Figure 3:
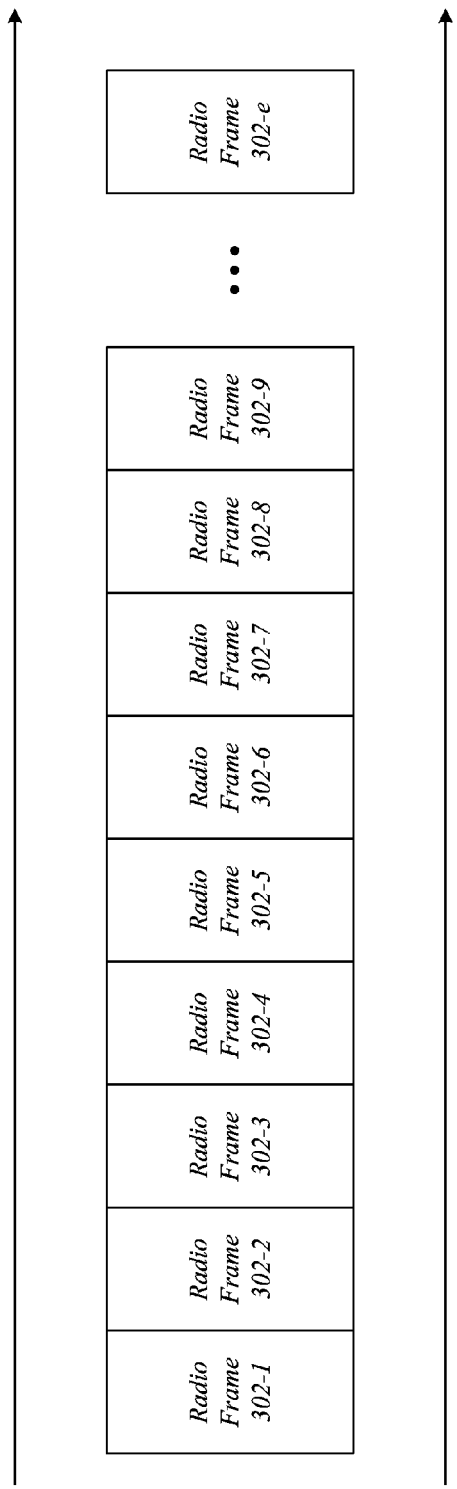
FIG. 3 illustrates an embodiment of a downlink channel.

FIG. 3 illustrates a diagram of an exemplary downlink channel 300 for the wireless network 100. As shown in FIG. 3, the downlink channel 300 may comprise multiple radio frames 302-*e*. The downlink channel 300 may represent a downlink channel used to convey control and data information from the base station 122 and the UE 110 in the macro node cell 120. Similarly, the downlink channel 300 may represent a downlink channel used to convey control and data information from the base station 132 and the UE 110 in the micro node cell 130.

In one embodiment, the downlink channel 300 may represent a LTE downlink channel. LTE supports frequency-division duplex (FDD), where uplink and downlink transmission are separated in frequency, as well as time-division duplex (TDD), where uplink and downlink are separated in time. LTE can be deployed in six different, specified system bandwidths of 1.4, 3, 5, 10, 15, and 20 Megahertz (MHz). With the introduction of carrier aggregation in LTE Release 10, up to five downlink carriers can be aggregated to utilize a maximum of 100 MHz.

Figure 4:
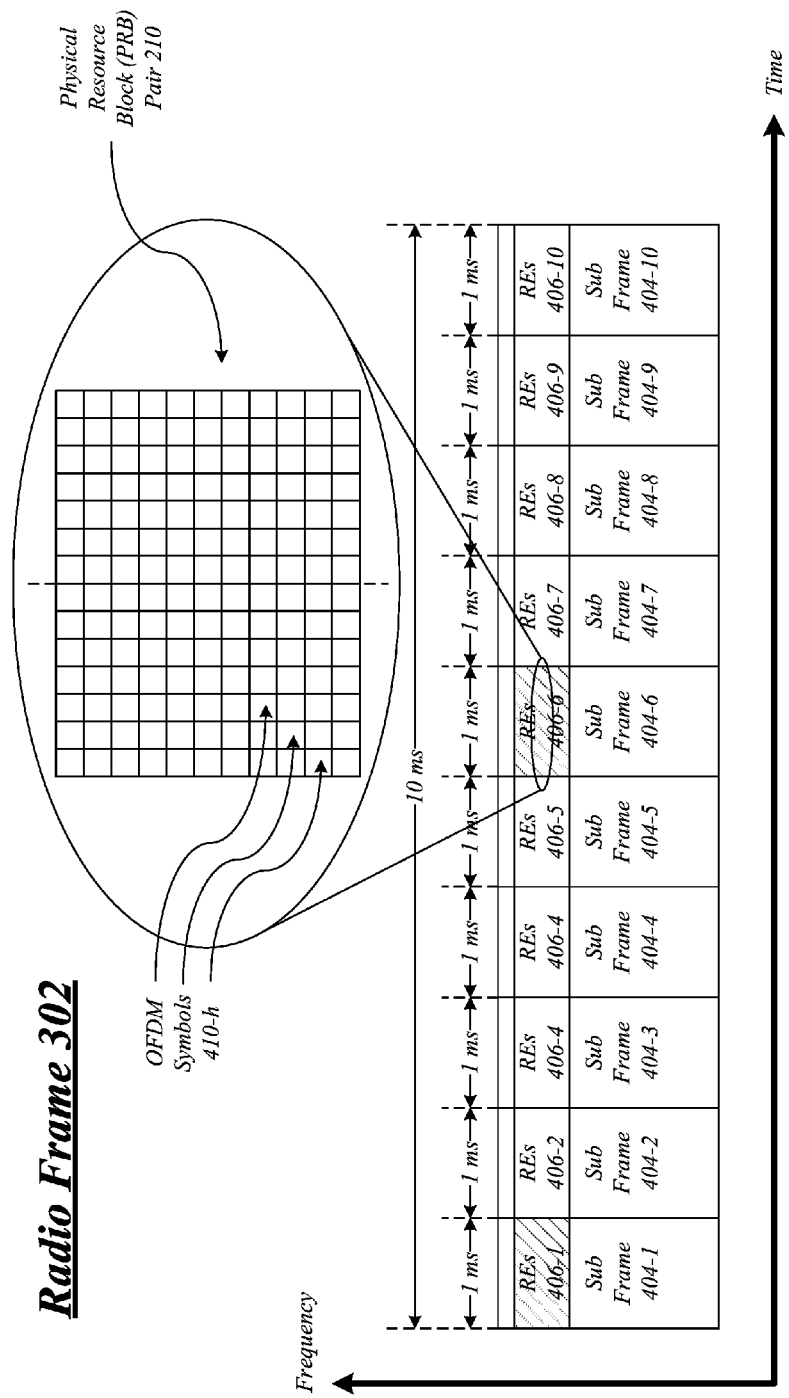
FIG. 4 illustrates an embodiment of a radio frame.

FIG. 4 illustrates an exemplary radio frame 302-*e*. The radio frame 302-*e* shown in FIG. 4 is a frame structure for a FDD downlink. For TDD, the frame structure is similar. One difference is that certain subframes 404-*f* are used for uplink instead of downlink.

As shown in FIG. 4, a radio frame 302-*e* may comprise multiple subframes 404-*f*. Each of the subframes 404-*f* may comprise one or more resource elements 406-*g*. In one embodiment, the resource elements 406-*g* may be implemented as one or more OFDM symbols 410-*h*. A LTE system uses OFDM, which divides the available system bandwidth into multiple orthogonal subcarriers in the frequency domain and into multiple OFDM symbols in the time domain. In order to limit the signaling complexity of addressing each time-frequency resource individually, multiple subcarriers and OFDM symbols have been grouped to form an addressable unit, a physical resource block (PRB) pair 210-*d*, which is highlighted in the expanded view of FIG. 4. Depending on the system bandwidth, between 6 and 110 PRB pairs compose a 1 millisecond (ms) subframe 404-*f*, and 10 subframes 404-1 through 404-10 form the radio frame 302-*e*.

With respect to the first carrier type (e.g., lean carrier type), as previously described, the first carrier type is designed to transmit CRS 240 in only certain subframes 404-*f* of the radio frame 302-*e* relative to the second carrier type in order to increase the potential for lower network energy consumption and reduced inter-cell interference. To reduce overhead, the CRS 240 may appear at periodic intervals, such as only once every five subframes. FIG. 4 illustrates subframes 404-1 and 404-6 (or subframes 0 and 5 if starting from zero) as containing CRS 240 (indicated by shading). Other periodic intervals and subframes 404-*f* may be used for the CRS 240. The embodiments are not limited in this context.

Figure 5:
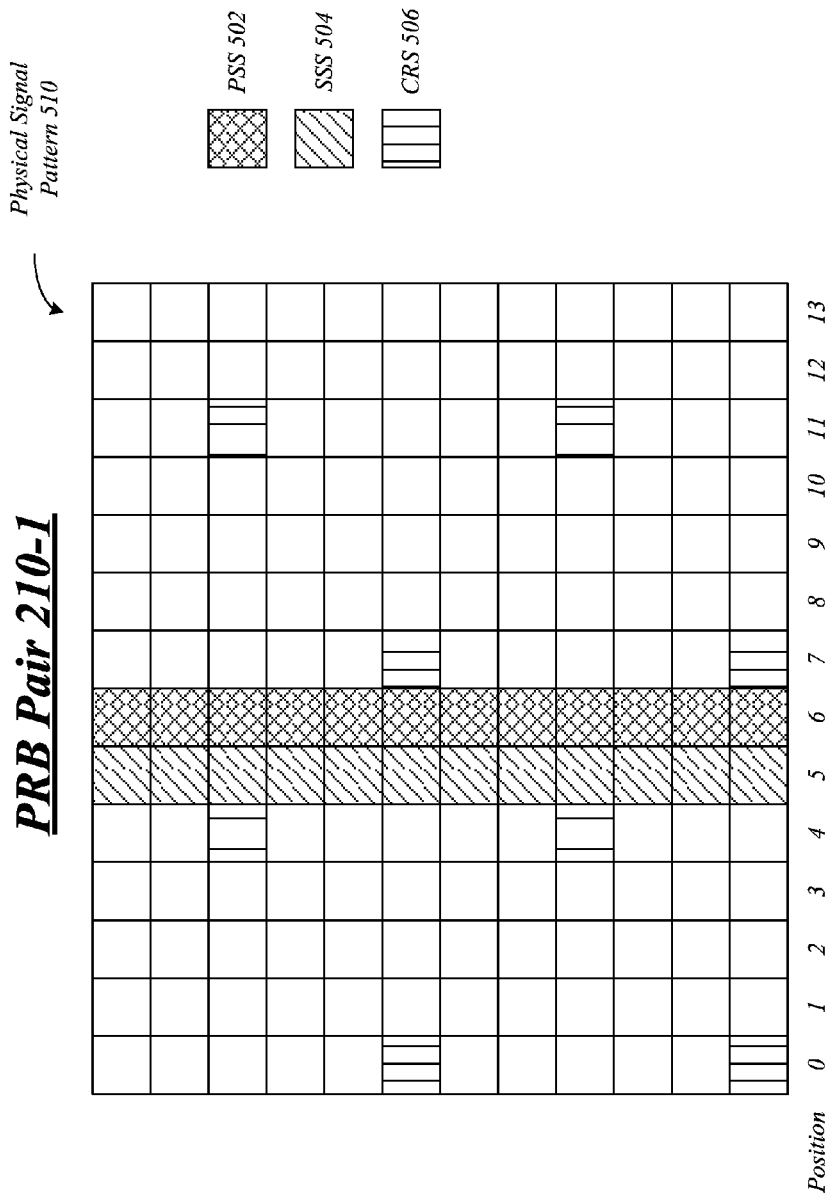
FIG. 5 illustrates an embodiment of a physical resource block (PRB) pair for a macro node cell.

FIG. 5 illustrates a PRB pair 210-1. PRB pair 210-1 may be representative example of a PRB pair 210-*d* used for a second carrier type (e.g., legacy carrier type) in case of normal cyclic prefix (CP). The PRB pair 210-1 may utilize a physical signal pattern 510. The physical signal pattern 510 may be of a second carrier type, with reference signals in certain positions (e.g., slots or columns) within the PRB pair 210-1. For instance, the physical signal pattern 510 may include a PSS 502, a SSS 504 and a CRS 506. The PSS 502 and/or the SSS 504 may comprise representative examples of the SS 230. The CRS 506 may comprise a representative example of the CRS 240.

As shown in FIG. 5, for example, the physical signal pattern 510 of the second carrier type comprises a PSS 502 in a sixth position in the PRB pair 210-1, a SSS 504 in a fifth position in the PRB pair 210-1, and a CRS 506 in a zero, fourth, seventh and eleventh positions in the PRB pair 210-1. It may be appreciated that certain rows of the physical signal pattern 510 may also have certain reference signals at defined positions as well.

The physical signal pattern 510 maintains a defined number of positions between the PSS 502 and a given CRS 506. For instance, a defined number of positions between the PSS 502 in the sixth position and the CRS 506 in the seventh position is equal to one position. The defined number of positions between the PSS 502 in the sixth position and the CRS 506 in the eleventh position is equal to five positions.

Similarly, the physical signal pattern 510 maintains a defined number of positions between the SSS 504 and a given CRS 506. For instance, a defined number of positions between the SSS 504 in the fifth position and the CRS 506 in the seventh position is equal to two positions. The defined number of positions between the SSS 504 in the fifth position and the CRS 506 in the eleventh position is equal to six positions.

When the UE 110 receives PRB pair 210-1 of the second carrier type over the downlink 300 with the base station 122 of the macro node cell 120 via connection 112, the network control component 222-1 may scan for the PSS 502 and/or the SSS 504. Once the network control component 222-1 locates the PSS 502 and/or the SSS 504, the network control component 222-1 may recognize the position of the PSS 502 and/or the SSS 504 (e.g., OFDM symbol/slot/subframe indices), and use the defined distances between the PSS 502 and the CRS 506, or the SSS 504 and the CRS 506, in the physical signal pattern 510 to locate the CRS 506.

Figure 6:
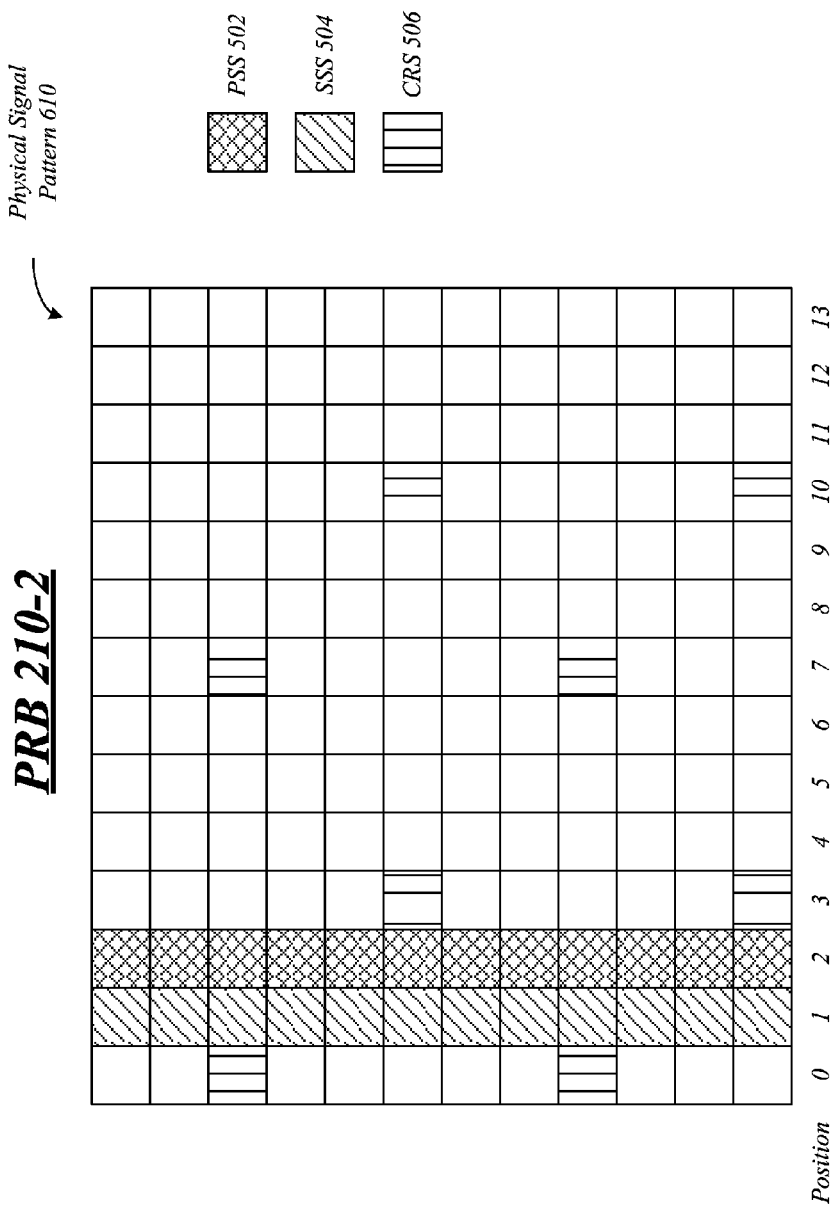
FIG. 6 illustrates an embodiment of a physical resource block (PRB) pair for a micro node cell.

FIG. 6 illustrates a PRB pair 210-2. PRB pair 210-2 may be representative example of a PRB pair 210-d used for a first carrier type (e.g., new carrier type or lean carrier type). The PRB pair 210-2 may utilize a physical signal pattern 610. The physical signal pattern 610 may be of a first carrier type, with reference signals in certain positions (e.g., slots or columns) within the PRB pair 210-2. As shown in FIG. 6, for example, the physical signal pattern 610 of the first carrier type comprises a PSS 502 in a second position in the PRB pair 210-2, a SSS 504 in a first position in the PRB pair 210-2, and a CRS 506 in a zero, third, seventh and tenth positions in the PRB pair 210-2. It may be appreciated that certain rows of the physical signal pattern 610 may also have certain reference signals at defined positions as well.

When the UE 110 receives PRB pair 210-2 of the first carrier type over the downlink 300 with the base station 132 of the micro node cell 130 via connection 114, the network control component 222-1 may scan for the PSS 502 and/or the SSS 504. Once the network control component 222-1 locates the PSS 502 and/or the SSS 504, the network control component 222-1 may recognize the position of the PSS 502 and/or the SSS 504 (e.g., OFDM symbol/slot/subframe indices), and use the defined distances between the PSS 502 and the CRS 506, or the SSS 504 and the CRS 506, in the physical signal pattern 610 to locate the CRS 506.

As illustrated in FIGS. 5, 6, the physical signal patterns 510, 610 each convey the synchronization signals and the reference signals, namely a PSS 502, a SSS 504 and a CRS 506. Furthermore, the actual positions of the PSS 502 and the CRS 506, and the SSS 504 and the CRS 506, are different in both physical signal patterns 510, 610. Namely, the positions of the PSS 502, the SSS 504 and the CRS 506 in the physical signal pattern 610 have been shifted four positions to the left (towards position zero) relative to the positions of the PSS 502, the SSS 504 and the CRS 506 in the physical signal pattern 510. However, despite this shift in positions, a number of positions between the PSS 502 and the CRS 506, and the SSS 504 and the CRS 506, are the same in both physical signal patterns 510, 610. Therefore, the UE 110 may be capable of finding the CRS 506 whether transmitted using the second carrier type or the first carrier type.

Once the network control component 222-1 locates the CRS 506, the cell selection component 222-2 of the UE 110 may measure power levels of the CRS 506 for surrounding cells 224-b via a neighbor cell search algorithm. The measured power levels may be used to determine a reference signal received power (RSRP) parameter or a reference signal received quality (RSRQ) parameter. The network control component 222-1 of the UE 110 may attempt to measure RSRP/RSRQ parameters in every subframe 404-f where the CRS 506 is transmitted, such as subframes 404-1 and 404-6 (or subframe 0 and subframe 5, respectively, when counting from zero). In addition, the network control component 222-1 of the UE 110 may also perform measurement operations at every first two OFDM symbols for each subframe 404-f since a multicast-broadcast single frequency network (MBSFN) configuration for a neighbor cell is not known to the UE 110 using the CRS 506. The RSRP parameter and/or RSRQ parameter may be used to select a cell 224-b, such as the macro node cell 120 or the micro node cell 130, among others.

Once the RSRP and RSRQ parameters are determined from the measured power levels of one or more of the CRS 506, and a cell 224-b is selected, the handoff component 222-3 of the UE 110 may perform handoff operations to the selected cell 224-b.

Shifting the PSS 502, SSS 504 and CRS 506 by a set number of positions between the physical signal patterns 510, 610, while maintaining a defined distance between the PSS 502/CRS 506 pair and the SSS 504/CRS 506 pair, provides several advantages relative to conventional techniques. For instance, collisions are avoided between PSS 502/SSS 504 and other reference signals used by the first carrier type, such as DMRS. In another example, legacy devices may be configured to use the first carrier type (e.g., lean carrier type) regardless of whether they are capable of discriminating between the first carrier type and the second carrier type. In another example, the uniform shift of the PSS 502/SSS 504 and the CRS 506 allows measurements to be given to the UE 110 as part of a neighbor cell list prior to perform a neighbor cell search algorithm. This avoids the inefficient need for the UE 110 to measure both second carrier types and first carrier types when only the PSS 502 and SSS 504 are shifted in the first carrier type. Other advantages are provided as well, and the embodiments are not limited to these examples.

Included herein is a set of logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

FIG. 7 illustrates an embodiment of a logic flow 700. The logic flow 700 may be representative of some or all of the operations executed by one or more embodiments described herein, such as the UE 110. More particularly, the logic flow 700 may be implemented by the network control component 122-1 of the UE 110.

In the illustrated embodiment shown in FIG. 7, the logic flow 700 at block 702 may receive a radio frame at user equipment (UE) over a downlink channel of a long term evolution (LTE) network, the radio frame to comprise a subframe with a physical resource block (PRB) pair, the PRB pair to have a physical signal pattern of a second carrier type or a first carrier type. For example, the network control component 222-1 of the UE 110 may receive a radio frame 302-*e* over the downlink channel 300 of the wireless network 100, the radio frame 302-*e* to comprise a subframe 404-*f* with a PRB pair 210-*d*, the PRB pair 210-*d* to have the physical signal pattern 510 of a second carrier type or the physical signal pattern 610 of the first carrier type. For this example, assume the network control component 222-1 receives the PRB pair 210-2 having the physical signal pattern 610.

The logic flow 700 at block 704 may search for a synchronization signal (SS) at a position within the PRB pair, the SS comprising a primary SS (PSS) or a secondary SS (SSS). For example, the network control component 222-1 may search for a SS 230 at a position within the PRB pair 210-2. The SS 230 may comprise a PSS 502 or a SSS 506.

The logic flow 700 at block 706 may locate a cell-specific reference signal (CRS) at another position within the PRB pair based on the position of the SS, the positions separated by a same defined number of positions within the PRB pair whether the physical signal pattern is of the second carrier type or the first carrier type. For instance, the network control component 122-1 may locate a CRS 506 at another position within the PRB pair 210-2 based on the position of the PSS 502 or the SSS 504. The positions between the PSS 502 and the CRS 506, or the SSS 504 and the CRS 506, may be separated by a same defined number of positions within the PRB pair 210-2 regardless of whether the received physical signal pattern is of the second carrier type or the first carrier type (e.g., physical signal pattern 510 or physical signal pattern 610).

The logic flow 700 at block 708 may measure a power level of the CRS. For instance, the cell selection component 222-2 may implement various RRM measurement techniques to measure power levels of the CRS 506 once located by the network control component 222-1. It is worthy to note that the modulated sequences on the CRS 506 does not matter since measurement operations for the RSRP/RSRQ do not necessarily require the exact sequence value. The cell selection component 222-2 may only need to measure an average power on the corresponding resource elements.

The measured power levels for the CRS 506 may be used for a number of different purposes. In one embodiment, the cell selection component 222-2 may determine a RSRP parameter or a RSRQ parameter from the measured power level of the CRS. In one embodiment, the cell selection component 222-2 may select a macro node cell or a micro node cell based on a RSRP parameter or a RSRQ parameter derived from the measured power level of the CRS. In one embodiment, the handoff component 222-3 may perform handoff operations based on a RSRP parameter or a RSRQ parameter determined from the measured power level of the CRS. These are merely a few exemplary uses, and others exist as well.

Figure 8:
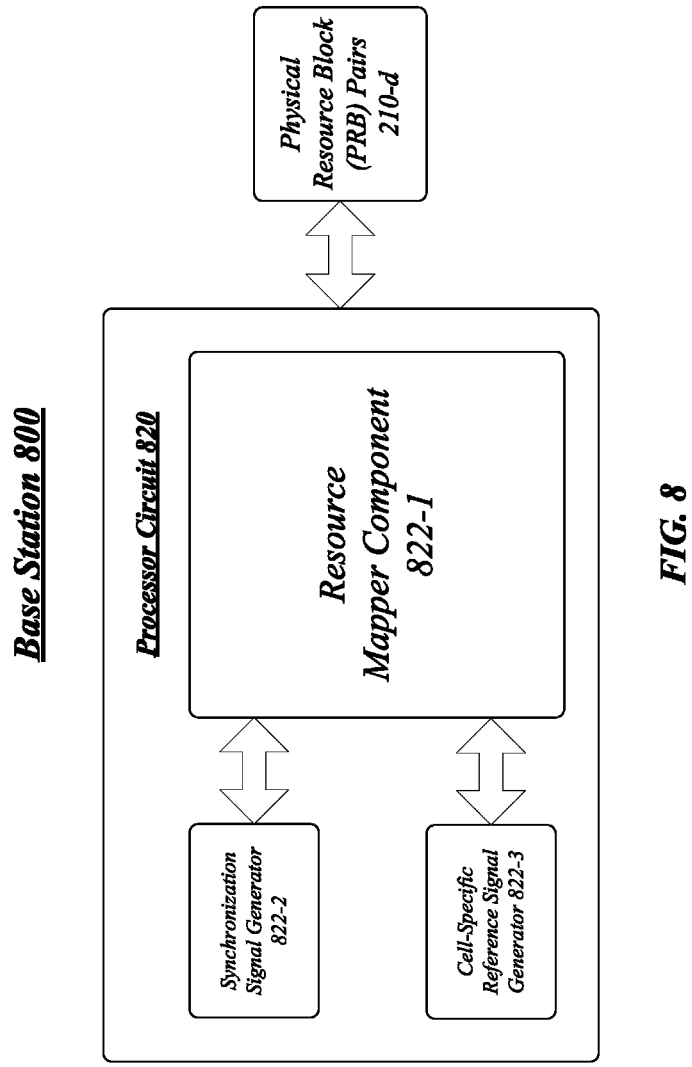
FIG. 8 illustrates an embodiment of a base station.

FIG. 8 illustrates a block diagram for a base station 800. The base station 800 may be a representative example for the base station 122 and/or the base station 132. Although the base station 800 shown in FIG. 8 has a limited number of elements in a certain topology, it may be appreciated that the base station 800 may include more or less elements in alternate topologies as desired for a given implementation.

The base station 800 may comprise any electronic device having a processor circuit 820 arranged to execute one or more software (or logic) components 822-*s*. As shown in FIG. 8, the base station 800 may comprise a resource mapper component 822-1-1, a SS generator 822-2 and a CRS generator 822-3. More or less components may be implemented in other embodiments. For instance, the base station 800 may include fast fourier transformers (FFT), inverse FFT (IFFT), cyclic prefix (CP) inserter, and other components typically found in an LTE eNB.

In one embodiment, the resource mapper component 822-1 may be arranged for execution by the processor circuit 820 (e.g., similar to the processor circuit 220), or alternatively, be implemented as stand-alone circuitry (e.g., an ASIC or FPGA). The resource mapper component 822-1 maps a SS 230 as generated by the SS generator 822-2, and a CRS 240 as generated by the CRS generator 822-3, to a resource of one or more predetermined subframes 404-*f*, such as one or more PRB pairs 210-*j*.

The resource mapper component 822-1 may map a SS 230 and a CRS 240 to a PRB pair 210-2 according to a physical signal pattern 610 for a first carrier type (as described with reference to FIG. 6). The physical signal pattern 610 for the first carrier type may have a same number of defined positions between the SS 230 and the CRS 240 within the PRB pair 210-2 as a physical signal pattern 510 for a second carrier type (as described with reference to FIG. 5).

As previously described with reference to the UE 110, the resource mapper component 822-1 may map a SS 230 and a CRS 240 within a same set of subframes 404-*f* of the radio frame 302-*e*. This is because when the SS 230 and the CRS 240 are located within a same subframe 404-*f* of a radio frame 302-*e*, the remaining subframes 404-*f* that do not contain the SS 230 and the CRS 240 may be turned off when no data traffic is present. This may result in higher energy efficiency.

FIG. 9 illustrates an embodiment of a logic flow 900. The logic flow 900 may be representative of some or all of the operations executed by one or more embodiments described herein, such as the base station 800. More particularly, the logic flow 900 may be implemented by the resource mapper component 822-1 of the base station 800.

In the illustrated embodiment shown in FIG. 9, the logic flow 900 at block 902 may generate a synchronization signal (SS) and a cell-specific reference signal (CRS). For example, the SS generator 822-2 may generate a SS 230, and the CRS generator 822-3 may generate a CRS 240.

The logic flow 900 at block 904 may map the SS and the CRS to a physical resource block (PRB) pair according to a physical signal pattern for a first carrier type or a second carrier type, the physical signal pattern for the first carrier type to have a same number of defined positions between the SS and the CRS within the PRB pair as a physical signal pattern for the second carrier type. For instance, the resource mapper component 822-1 may map the SS 230 and the CRS 240 to a PRB 210-1 according to a physical signal pattern 510 of the second carrier type or a PRB pair 210-2 according to a physical signal pattern 610 for a first carrier type. The physical signal pattern 610 for the first carrier type may have a same number of defined positions between the SS 230 and the CRS 240 within the PRB pair 210-2 as the physical signal pattern 510 for the second carrier type.

The logic flow 900 at block 906 may send the mapped PRB pair in a subframe of a radio frame over a downlink channel of a long term evolution (LTE) network. For instance, the base station 800 may send the PRB pair 210-2 in a subframe 404-*j* of a radio frame 302-*e* over a downlink channel 300 of a wireless system 100.

As previously described, the resource mapper component 822-1 may map a SS 230 and a CRS 240 within a given PRB pair 210-*j* in a certain manner to allow the UE 110 to utilize both second carrier types and first carrier types, among other advantages. Expanding on this concept to a higher level, the resource mapper component 822-1 may be arranged to map a SS 230 and a CRS 240 within a same set of subframes 404-f of a given radio frame 302-e. For instance, when the SS 230 and the CRS 240 are located within a same subframe 404-f (e.g., subframes 404-1, 404-6), those subframes 404-f that do not contain the SS 230 and the CRS 240 (e.g., subframes 404-2, 404-3, 404-4, 404-5, 404-7, 404-8, 404-9 and 404-10) may be turned off when no data traffic is present. This may result in higher energy efficiency. This feature may be described in more detail with reference to FIGS. 10-15.

Figure 10:
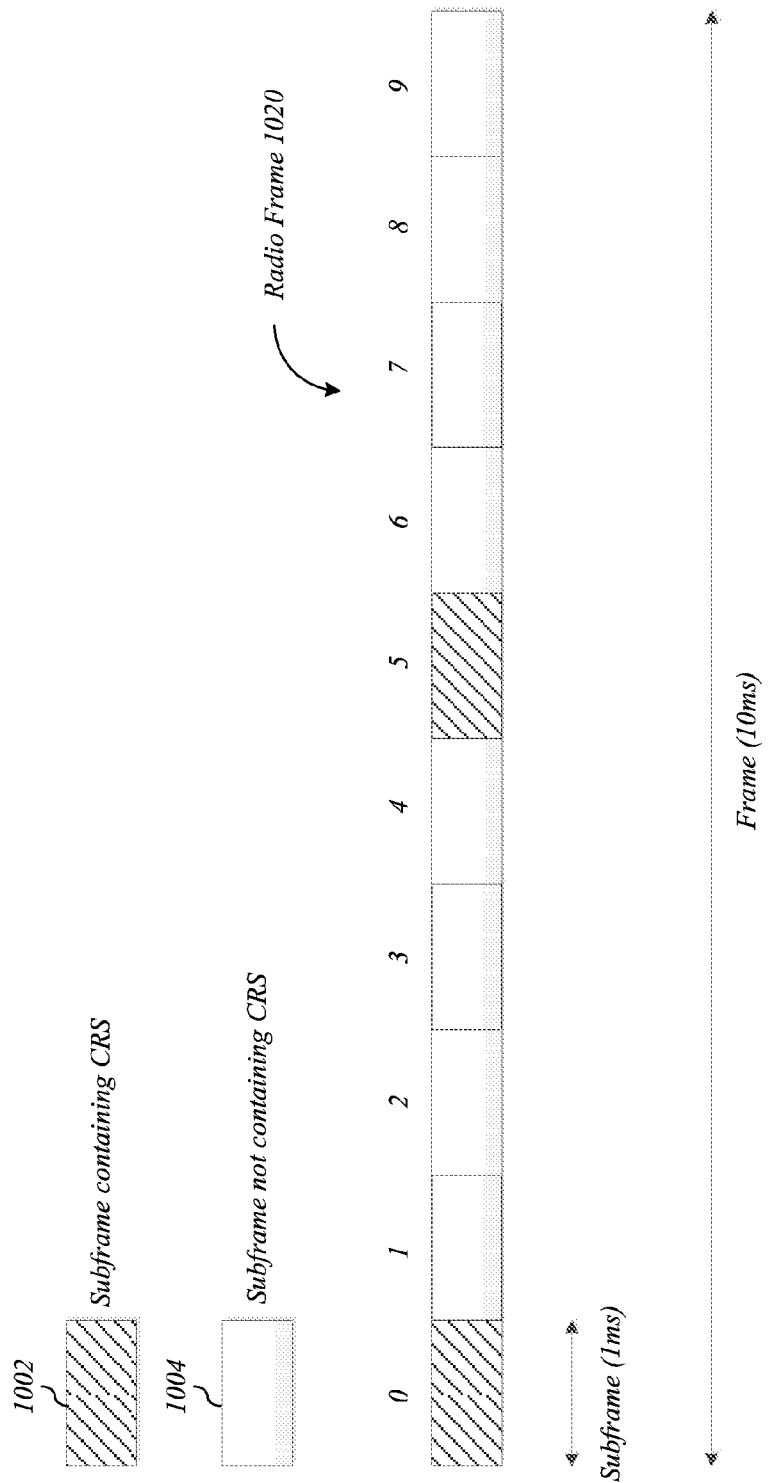
FIG. 10 illustrates an embodiment of a radio frame with a defined periodicity.

FIG. 10 illustrates an embodiment of a radio frame 1020 with a defined periodicity of 5 ms. The radio frame 1020 may a representative example of the radio frame 302-e. The radio frame 1020 comprises 10 subframes, with subframes 0 and 5 of a subframe type 1002 that contains a CRS 506, and subframes 1-4 and 6-9 of a subframe type 1004 not containing a CRS 506. If all cells 224-b in the same frequency band were to use the same physical signal pattern (e.g., subframes 0 and 5), then radio frames 1020 of different cells 224-b would potentially collide. This would negatively impact performance of time/frequency tracking.

Figure 11:
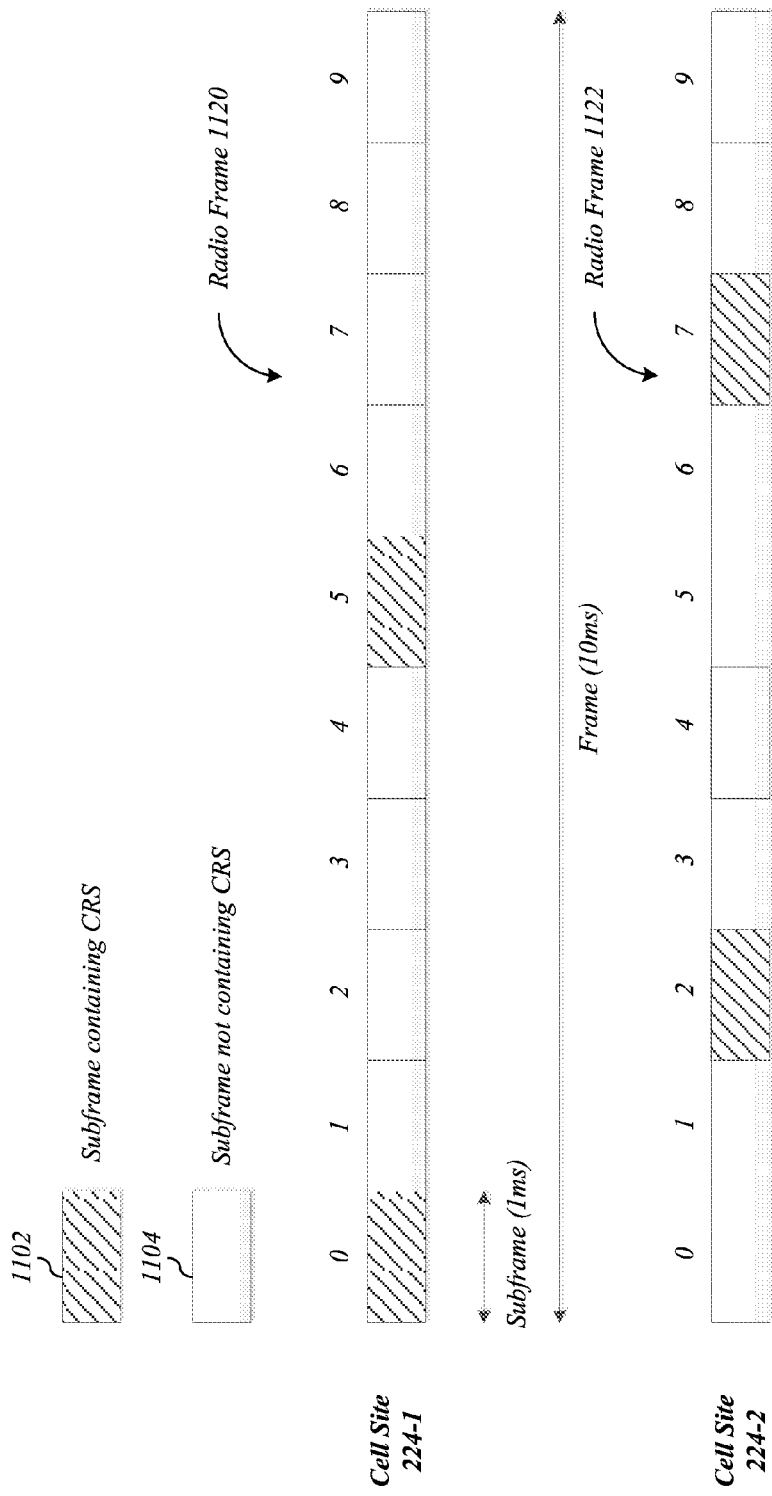
FIG. 11 illustrates an embodiment of a radio frame with collision avoidance.

FIG. 11 illustrates an embodiment of a pair of radio frames 1120, 1122 configured for collision avoidance. The radio frames 1120, 1122 may comprise representative examples of the radio frame 302-e. The radio frames 1120, 1122 each comprise 10 subframes for a cell 224-1 and a cell 224-2, respectively. For cell 224-1, the radio frame 1120 comprises subframes 0 and 5 of a subframe type 1102 that contains a CRS 506, and subframes 1-4 and 6-9 of a subframe type 1104 not containing a CRS 506. For cell 224-2, the radio frame 1122 comprises subframes 2 and 7 of a subframe type 1102 that contains a CRS 506, and subframes 1, 3-6 and 8-9 of a subframe type 1104 not containing a CRS 506. By using different scheduling patterns for the radio frames 1120, 1122, collisions may be avoided between cells 224-1, 224-2.

In one embodiment, a given scheduling pattern may be assigned to a given cell 224-b through radio resource control (RRC) signaling. The RRC signaling may be performed in accordance with the RRC protocol of the universal mobile telecommunications system (UMTS) wideband code division multiple access (WCDMA) protocol stack that handles control plane signaling of layer 3 between the UE 110 and a universal terrestrial radio access network (UTRAN) or Evolved-UTRAN (E-UTRAN). This technique may be utilized in a case of dual-connectivity, where the UE 110 may simultaneously use the connections 112, 114 to connect to base stations 122, 132, respectively, where the base station 122 is a primary cell utilizing the second carrier type (e.g., legacy carrier types) and the base station 132 is a secondary cell utilizing the first carrier type (e.g., the lean carrier type). This configuration may also be referred to as a dependent mode. In the dependent mode, the base station 122 acting as the primary cell (e.g., macro node cell 120) may provide a scheduling pattern for the base station 132 acting as the secondary cell (e.g., micro node cell 130) via RRC signaling.

In one embodiment, a unique scheduling pattern may be selected for a given cell 224-b based on a physical cell identifier (PCI). This technique may be utilized in a case of singular-connectivity, where the base station 132 of the micro node cell 130 utilizing the first carrier type (e.g., the lean carrier type) may operate as a primary or standalone cell, without assistance needed or available from other cells. This configuration may be referred to as an independent mode. As the UE 110 will not know the exact position of a PSS 502, SSS 504 and CRS 506 in an initial neighbor cell search algorithm when operating in independent mode, it is desirable that a time location of the PSS 502, SSS 504 and CRS 506 is fixed in a manner that allows the UE 110 to successfully detect the PSS 502, SSS 504 and CRS 506. One way accomplish this is to tying a time location for a CRS 506 with a PCI for a cell 224-b. In other words, the resource mapper component 222-1 of the base station 800 may generate a scheduling pattern for a given cell 224-b based on a PCI for the cell 224-b, as described further below.

The case for the transmission of PSS 502, SSS 504 and CRS 506 within a same set of subframes 404-f in a given radio frame 302-e can be represented as follows. The instances for PSS 502, SSS 504 and CRS 506 in a PRB pair 210-d of a first carrier type (e.g., lean carrier type) shall satisfy Equation (1) as follows:

$$(10 \times n_f + \lfloor n_s/2 \rfloor - \Delta_{CRS}) \bmod T_{CRS} = 0 \qquad \text{Equation (1)}$$

where $n_f$ is the radio frame number and $n_s$ is the slot number within a radio frame, where $\Delta_{CRS}$ is the CRS subframe offset and can be a function of PCI, and $T_{CRS}$ is the periodicity of a CRS (e.g., can be 5 or 10-subframe unit). An example for $\Delta_{CRS}$ may be shown in Equation (2) as follows:

$$\Delta_{CRS} = f(N_{ID}^{cell}) \qquad \text{Equation (2)}$$

where $N_{ID}^{cell}$ is a PCI. An example of $T_{CRS}$ may be $T_{CRS}=5$ when two subframes 404-f within a radio frame 302-e are used for CRS transmission.

For Equation (2), a variety of options may be considered for a given implementation. A first option can be shown by Equation (3) as follows:

$$\Delta_{CRS} = N_{ID}^{cell} \qquad \text{Equation (3)}$$

The first option can be applied when frequency shift is not applied (e.g., $v_{shift}=0$). A second option can be shown in Equation (4) as follows:

$$\Delta_{CRS} = \lfloor N_{ID}^{cell}/6 \rfloor \qquad \text{Equation (4)}$$

The second option can be applied when frequency shift according to PCI ($v_{shift}=N_{ID}^{cell} \bmod 6$) is applied.

Figure 12:
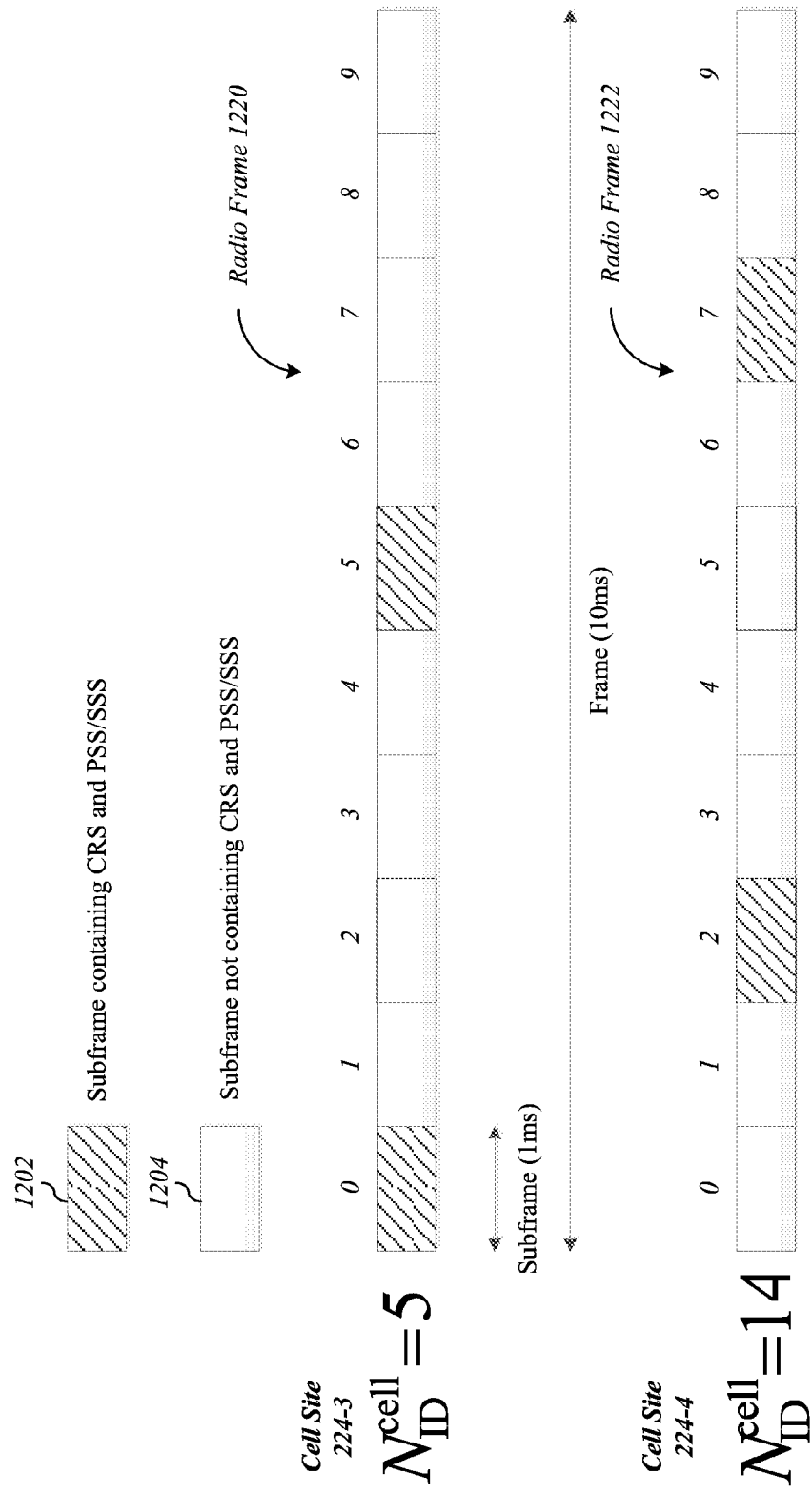
FIG. 12 illustrates an embodiment of a radio frame with cell identifiers.

FIG. 12 illustrates an embodiment of a pair of radio frames 1220, 1222 with cell identifiers used for collision avoidance. The radio frames 1220, 1222 may be representative examples of the radio frame 302-e. The radio frames 1220, 1222 each comprise 10 subframes for different cells having a PCI of 5 and 14, respectively. The physical signal patterns for the two different cells have been selected using Equations (1) through (4) as previously described. More particularly, the radio frames 1220, 1222 provide an example with $\Delta_{CRS}=\lfloor N_{ID}^{cell}/6 \rfloor$ and $T_{CRS}=5$.

As shown in FIG. 12, for a cell 224-3 with a PCI of 5, the radio frame 1220 comprises subframes 0 and 5 of a subframe type 1202 that contains a PSS 502, SSS 504 and CRS 506, with all other subframes 1-4 and 6-9 of a subframe type 1204 not containing a PSS 502, SSS 504 and CRS 506. For a cell 224-4 with a PCI of 14, the radio frame 1222 comprises subframes 2 and 7 of a subframe type 1202 that contains a PSS 502, SSS 504 and CRS 506, with all other subframes 1, 3-6 and 8-9 of a subframe type 1204 not containing a PSS 502, SSS 504 and CRS 506. By using different scheduling patterns for the radio frames 1220, 1222, collisions may be avoided between the cells 224-3, 224-4.

Figure 13:
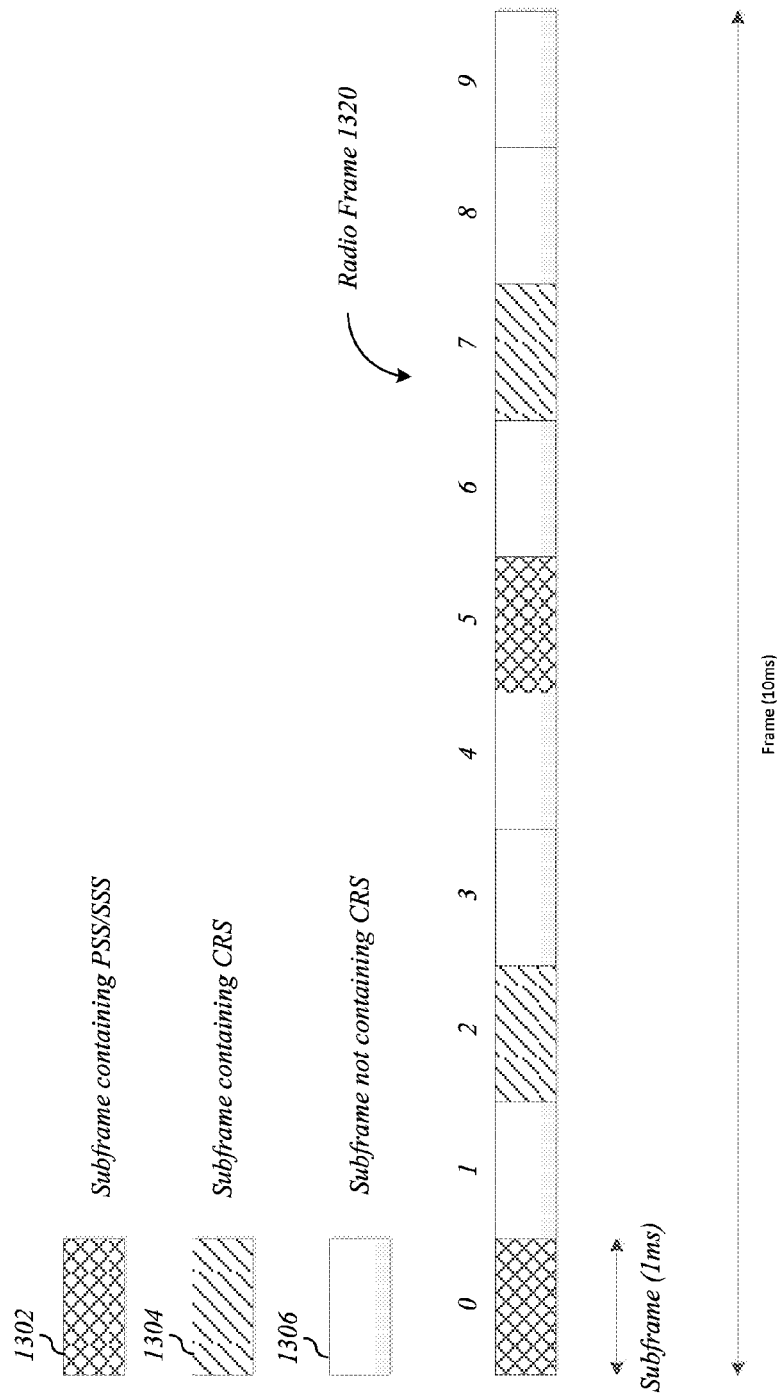
FIG. 13 illustrates an embodiment of a radio frame with subframes turned off.

FIG. 13 illustrates an embodiment of a radio frame 1320 with certain subframes turned off. The radio frame 1320 may be a representative example of the radio frame 302-e. The radio frame 1320 comprises 10 subframes, with subframes 0 and 5 of a subframe type 1302 that contains a PSS 502 and a SSS 504, subframes 2 and 7 of a subframe type 1304 that contains only a CRS 506, and all other subframes 1, 3-4, 6 and 8-9 of a subframe type 1306 not containing a CRS 506. As PSS 502, SSS 504 and CRS 506 transmissions are cell-specific for the UE 110 in order to perform time/frequency tracking, the subframes 404-f containing PSS 502, SSS 504 and CRS 506 need to be turned off all the time. In this example, up to 6 subframes (e.g., subframes 1, 3, 4, 6, 8 and 9) within the radio frame 1320 can be turned off.

Figure 14:
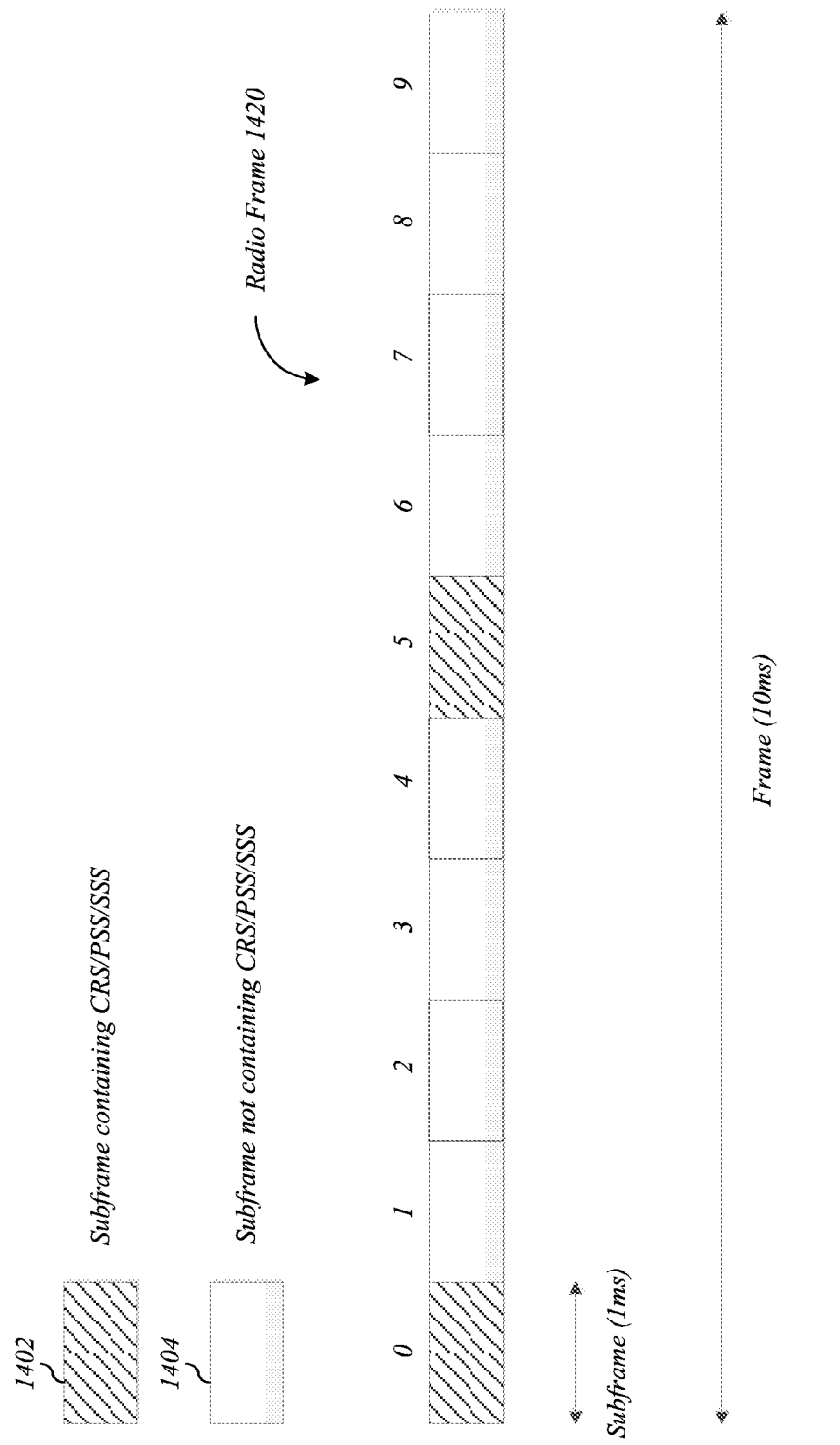
FIG. 14 illustrates an embodiment of a radio frame with subframes turned off.

FIG. 14 illustrates an embodiment of a radio frame 1420 with certain subframes turned off. The radio frame 1420 may be a representative example of the radio frame 302-e. The radio frame 1420 comprises 10 subframes, with subframes 0 and 5 of a subframe type 1402 that contains a PSS 502, a SSS 504 and a CRS 506, with all other subframes 1-4 and 6-9 of a subframe type 1404 not containing a PSS 502, a SSS 504 and a CRS 506. As PSS 502, SSS 504 and CRS 506 transmissions are cell-specific for the UE 110 in order to perform time/frequency tracking, the subframes containing PSS 502, SSS 504 and CRS 506 need to be turned on all the time. In this example, up to 8 subframes (e.g., subframes 1-4 and 6-9) within the radio frame 1420 can be turned off. This is a greater number of subframes than shown with the scheduling pattern of the radio frame 1320, where a PSS 502, SSS 504 and CRS 506 are scattered among different subframes. As a result, transmitting a PSS 502, SSS 504 and CRS 506 in a same set of subframes 0-9 provides greater network energy saving by allowing more subframes 404-f to be turned off for a given radio frame 302-e.

It is worthy to note that a physical broadcast channel (P-BCH) can be transmitted in a same subframe as a PSS 502, SSS 504 and CRS 506 if it is defined for a first carrier type used in an independent mode. As such, the same principles can be applied to the P-BCH as previously described with respect to PSS 502, SSS 504 and CRS 506.

FIG. 15 illustrates an embodiment of a configuration table 1500. The configuration table 1500 may be used for TDD uplink (UL) and/or downlink (DL) configurations. Since available DL subframes are limited in TDD, the instances for CRS and/or PSS/SSS used in a first carrier type (e.g., a lean carrier type) shall satisfy Equation (5) as follows:

$$(10 \times n_f + \lfloor n_s/2 \rfloor - k) \bmod T_{CRS} = 0 \quad \text{Equation (5)}$$

where $T_{CRS}$=5, and k is the closest DL subframe index to $\Delta_{CRS}$ as shown in Equation (4). As illustrated in the configuration table 1500, the DL subframe can be indicated by a "D" or a "S."

It is worthy to note that although physical signal patterns and scheduling patterns are described with reference to certain types of physical information and physical channels, it may be appreciated that embodiments may be implemented with any type of physical information and physical channels to gain the same or similar advantages. For instance, embodiments may be implemented with a physical broadcast channel (PBCH), PDSCH, or any other physical channels and physical information carried therein. In one embodiment, with respect to the PBCH, the PSS 502, SSS 504, CRS 506 and the PBCH (for the first and/or second carrier type) may all be transmitted on a same subframe or set of subframes. Embodiments are not limited in this context.

Figure 16:
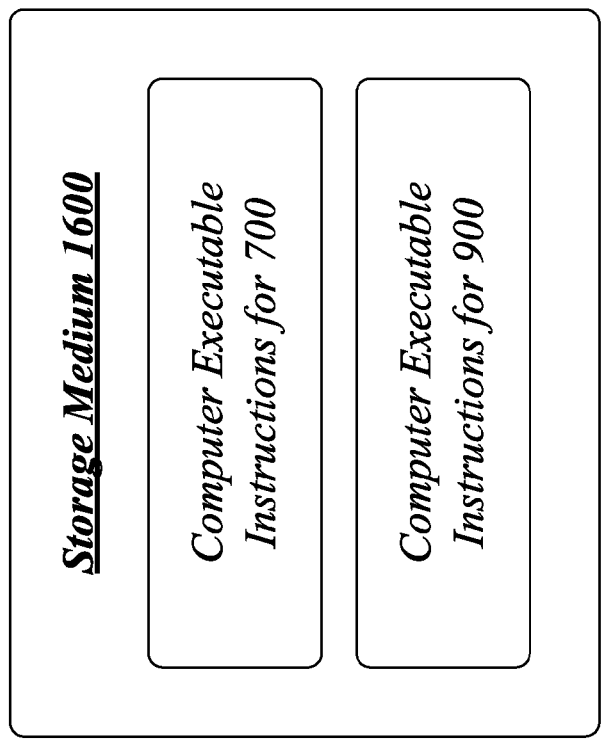
FIG. 16 illustrates an embodiment of a storage medium.

FIG. 16 illustrates an embodiment of a storage medium 1600. The storage medium 1600 may comprise an article of manufacture. In one embodiment, the storage medium 1600 may comprise any non-transitory computer readable medium or machine readable medium, such as an optical, magnetic or semiconductor storage. The storage medium may store various types of computer executable instructions, such as instructions to implement one or more of the logic flows 700 and/or 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 17:
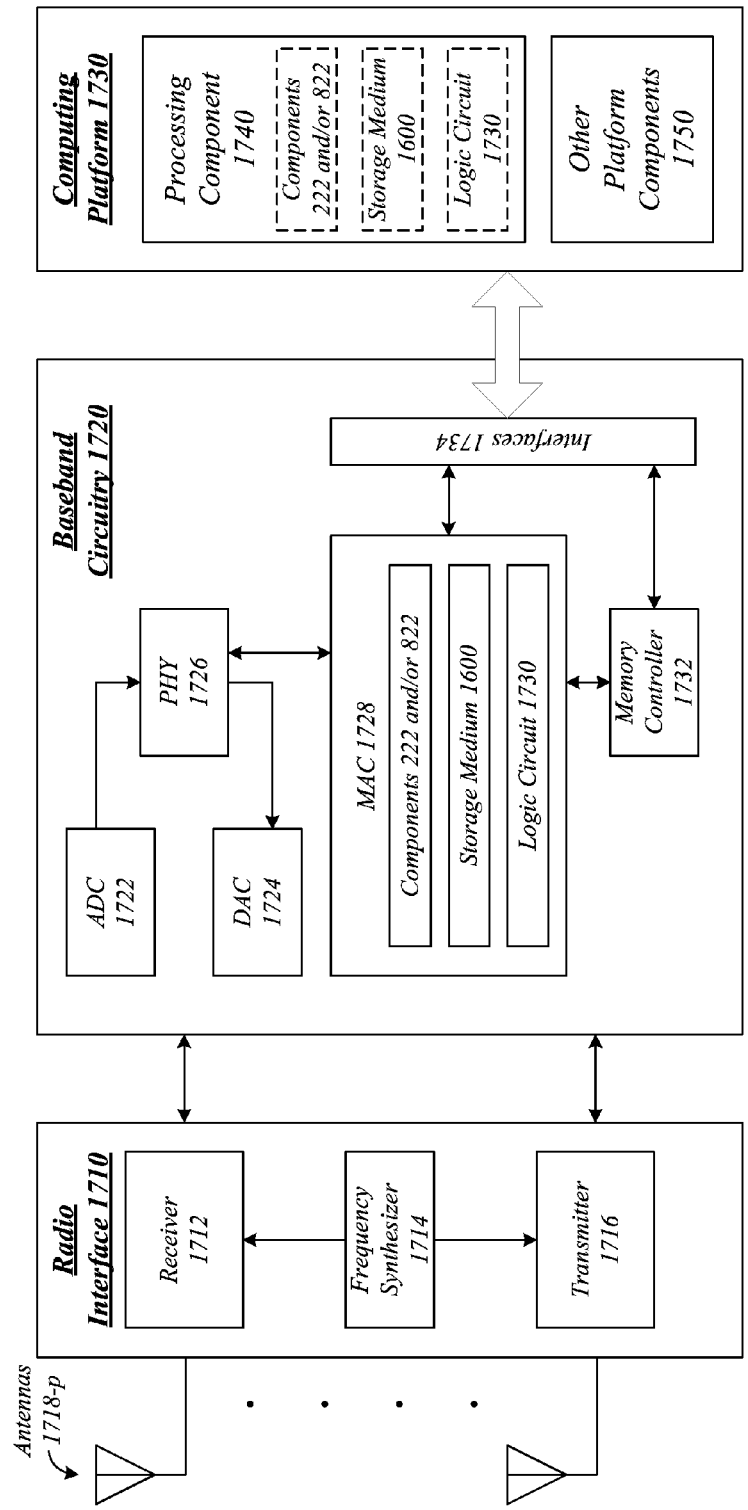
FIG. 17 illustrates an embodiment of a communications device.

FIG. 17 illustrates an embodiment of a device 1700 for use in a multicarrier OFDM system, such as the wireless system 100. Device 1700 may implement, for example, UE 170, base station 800, storage medium 1000 and/or a logic circuit 1730. The logic circuit 1730 may include physical circuits to perform operations described for the UE 170 or the base station 800. As shown in FIG. 17, device 1700 may include a radio interface 1710, baseband circuitry 1720, and computing platform 1730, although embodiments are not limited to this configuration.

The device 1700 may implement some or all of the structure and/or operations for the UE 170, base station 800, the storage medium 1000 and/or logic circuit 1730 in a single computing entity, such as entirely within a single device. Alternatively, the device 1700 may distribute portions of the structure and/or operations for the UE 170, base station 800, storage medium 1000 and/or logic circuit 1730 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1710 may include, for example, a receiver 1712, a transmitter 1716 and/or a frequency synthesizer 1714. Radio interface 1710 may include bias controls, a crystal oscillator and/or one or more antennas 1718-p. In another embodiment, radio interface 1710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1720 may communicate with radio interface 1710 to process receive and/or transmit signals and may include, for example, an analog-to-digital converter 1722 for down converting received signals, a digital-to-analog converter 1724 for up converting signals for transmission. Further, baseband circuitry 1720 may include a baseband or physical layer (PHY) processing circuit 1756 for PHY link layer processing of respective receive/transmit signals. Baseband circuitry 1720 may include, for example, a processing circuit 1728 for medium access control (MAC)/data link layer processing. Baseband circuitry 1720 may include a memory controller 1732 for communicating with processing circuit 1728 and/or a computing platform 1730, for example, via one or more interfaces 1734.

In some embodiments, PHY processing circuit 1726 may include a frame construction and/or detection module, in combination with additional circuitry such as a buffer memory, to construct and/or deconstruct communication frames, such as radio frames 302-e. Alternatively or in addition, MAC processing circuit 1728 may share processing for certain of these functions or perform these processes independent of PHY processing circuit 1726. In some embodiments, MAC and PHY processing may be integrated into a single circuit.

The computing platform 1730 may provide computing functionality for the device 1700. As shown, the computing platform 1730 may include a processing component 1740. In addition to, or alternatively of, the baseband circuitry 1720, the device 1700 may execute processing operations or logic for the UE 170, base station 800, storage medium 1000, and logic circuit 1730 using the processing component 1730. The processing component 1730 (and/or PHY 1726 and/or MAC 1728) may comprise various hardware elements, software elements, or a combination of both. Examples of hardware elements may include devices, logic devices, components, processors, microprocessors, circuits, processor circuits (e.g., processor circuits 220, 820), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1730 may further include other platform components 1750. Other platform components 1750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1700 described herein, may be included or omitted in various embodiments of device 1700, as suitably desired. In some embodiments, device 1700 may be configured to be compatible with protocols and frequencies associated one or more of the 3GPP LTE Specifications and/or IEEE 1702.16 Standards for WMANs, and/or other broadband wireless networks, cited herein, although the embodiments are not limited in this respect.

Embodiments of device 1700 may be implemented using single input single output (SISO) architectures. However, certain implementations may include multiple antennas (e.g., antennas 1718-p) for transmission and/or reception using adaptive antenna techniques for beamforming or spatial division multiple access (SDMA) and/or using MIMO communication techniques.

The components and features of device 1700 may be implemented using any combination of discrete circuitry, application specific integrated circuits (ASICs), logic gates and/or single chip architectures. Further, the features of device 1700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1700 shown in the block diagram of FIG. 17 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Furthermore, in the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

In addition, the term "and/or" may mean "and," it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the scope of the appended claims.

In one embodiment, user equipment (UE) may comprise a processor circuit, and a network control component for execution on the processor circuit to locate a synchronization signal (SS) and a cell-specific reference signal (CRS) in a physical resource block (PRB) pair of a long term evolution (LTE) system, the PRB pair having a physical signal pattern for a first carrier type, the physical signal pattern for the first carrier type to have a same number of defined positions between the SS and the CRS within the PRB pair as a physical signal pattern for a second carrier type.

In the UE embodiment, the SS may comprise a primary synchronization signal (PSS) or a secondary synchronization signal (SSS).

In the UE embodiment, the physical signal pattern of the second carrier type may comprise the PSS to have a sixth position in the PRB pair, the SSS to have a fifth position in the PRB pair, and the CRS to have a zero, fourth, seventh or eleventh position in the PRB pair.

In the UE embodiment, the physical signal pattern of the first carrier type may comprise the PSS to have a second position in the PRB pair, the SSS to have a first position in the PRB pair, and the CRS to have a zero, third, seventh or tenth position in the PRB pair.

In the UE embodiment, the UE may further comprise a cell selection component for execution on the processor circuit to determine a reference signal received power (RSRP) parameter or a reference signal received quality (RSRQ) parameter from the CRS.

In the UE embodiment, the UE may further comprise a handoff component for execution on the processor circuit to perform handoff operations based on a reference signal received power (RSRP) parameter or a reference signal received quality (RSRQ) parameter determined from the CRS.

In the UE embodiment, the radio frame may further comprise multiple subframes, the SS and the CRS located within a same set of subframes of the radio frame.

In the UE embodiment, the UE may further comprise a radio-frequency (RF) transceiver to receive electromagnetic signals representing a radio frame from a downlink channel of the LTE system, the radio frame to comprise a subframe with the PRB pair.

In the UE embodiment, the UE may further comprise a touchscreen display, an input device, and an antenna.

In one embodiment, a mobile device may comprise a radio-frequency (RF) transceiver to receive a radio frame over a downlink channel of a long term evolution (LTE) system, the radio frame to comprise a subframe with a physical resource block (PRB) pair, the PRB pair to have a physical signal pattern of a first carrier type or a second carrier type. The mobile device may further comprise a processor circuit communicatively coupled to the RF transceiver, and a network control component for execution on the processor circuit to locate a synchronization signal (SS) at a position within the PRB pair, locate a cell-specific reference signal (CRS) at another position within the PRB pair based on the position of the SS, the positions separated by a same defined number of positions within the PRB pair whether the physical signal pattern is of the first carrier type or the second carrier type.

In the mobile device embodiment, the SS may comprise a primary synchronization signal (PSS) or a secondary synchronization signal (SSS).

In the mobile device embodiment, the physical signal pattern of the second carrier type may comprise the PSS to have a sixth position in the PRB pair, the SSS to have a fifth position in the PRB pair, and the CRS to have a zero, fourth, seventh or eleventh position in the PRB pair.

In the mobile device embodiment, the physical signal pattern of the first carrier type may comprise the PSS to have a second position in the PRB pair, the SSS to have a first position in the PRB pair, and the CRS to have a zero, third, seventh or tenth position in the PRB pair.

In the mobile device embodiment, the mobile device may further comprise a cell selection component for execution on the processor circuit to determine a reference signal received power (RSRP) parameter or a reference signal received quality (RSRQ) parameter from the CRS.

In the mobile device embodiment, the mobile device may further comprise a handoff component for execution on the processor circuit to perform handoff operations based on a reference signal received power (RSRP) parameter or a reference signal received quality (RSRQ) parameter determined from the CRS.

In the mobile device embodiment, the mobile device may further comprise a touchscreen display, an input device, and a memory port.

In one embodiment, a method may comprise receiving a radio frame at user equipment (UE) over a downlink channel of a long term evolution (LTE) system, the radio frame to comprise a subframe with a physical resource block (PRB) pair, the PRB pair to have a physical signal pattern of a first carrier type or a second carrier type; searching for a synchronization signal (SS) at a position within the PRB pair, the SS comprising a primary SS (PSS) or a secondary SS (SSS); locating a cell-specific reference signal (CRS) at another position within the PRB pair based on the position of the SS, the positions separated by a same defined number of positions within the PRB pair whether the physical signal pattern is of the first carrier type or the second carrier type; and measuring a power level of the CRS.

In the method embodiment, the physical signal pattern of the second carrier type may comprise the PSS to have a sixth position in the PRB pair, the SSS to have a fifth position in the PRB pair, and the CRS to have a zero, fourth, seventh or eleventh position in the PRB pair.

In the method embodiment, the physical signal pattern of the first carrier type may comprise the PSS to have a second position in the PRB pair, the SSS to have a first position in the PRB pair, and the CRS to have a zero, third, seventh or tenth position in the PRB pair.

In the method embodiment, the method may comprise determining a reference signal received power (RSRP) parameter or a reference signal received quality (RSRQ) parameter from the measured power level of the CRS.

In the method embodiment, the method may comprise selecting a macro node cell or a micro node cell based on a reference signal received power (RSRP) parameter or a reference signal received quality (RSRQ) parameter derived from the measured power level of the CRS.

In the method embodiment, the method may comprise performing handoff operations based on a reference signal received power (RSRP) parameter or a reference signal received quality (RSRQ) parameter determined from the measured power level of the CRS.

In one embodiment, an evolved node B (eNB) may comprise circuitry, and a resource mapper component for execution on the circuitry to map a synchronization signal (SS) and a cell-specific reference signal (CRS) to a physical resource block (PRB) pair according to a physical signal pattern for a first carrier type, the physical signal pattern for the first carrier type to have a same number of defined positions between the SS and the CRS within the PRB pair as a physical signal pattern for a second carrier type.

In the eNB embodiment, the PRB pair may comprise multiple orthogonal frequency-division multiplexing (OFDM) symbols.

In the eNB embodiment, the SS may comprise a primary synchronization signal (PSS) or a secondary synchronization signal (SSS).

In the eNB embodiment, the physical signal pattern of the second carrier type may comprise the PSS to have a sixth position in the PRB pair, the SSS to have a fifth position in the PRB pair, and the CRS to have a zero, fourth, seventh or eleventh position in the PRB pair.

In the eNB embodiment, the physical signal pattern of the first carrier type may comprise the PSS to have a second position in the PRB pair, the SSS to have a first position in the PRB pair, and the CRS to have a zero, third, seventh or tenth position in the PRB pair.

In the eNB embodiment, the eNB may further comprise a radio-frequency (RF) transceiver to transmit electromagnetic signals representing a radio frame over a downlink channel of a long term evolution (LTE) system, the radio frame to comprise multiple subframes, with one of the subframes to comprise the PRB pair.

In the eNB embodiment, the resource mapper component may map a SS and a CRS within a same set of subframes of the radio frame.

In the eNB embodiment, the eNB may further comprise an input device, a memory port, and an antenna.

In a second method embodiment, the method may comprise generating a synchronization signal (SS) and a cell-specific reference signal (CRS); and mapping the SS and the CRS to a physical resource block (PRB) pair according to a physical signal pattern for a first carrier type or a second carrier type, the physical signal pattern for the first carrier type to have a same number of defined positions between the SS and the CRS within the PRB pair as a physical signal pattern for the second carrier type.

In the second method embodiment, the method may comprise sending the mapped PRB pair in a subframe of a radio frame over a downlink channel of a long term evolution (LTE) system.

In the second method embodiment, the physical signal pattern of the second carrier type to comprise the PSS to have a sixth position in the PRB pair, the SSS to have a fifth position in the PRB pair, and the CRS to have a zero, fourth, seventh or eleventh position in the PRB pair.

In the second method embodiment, the physical signal pattern of the first carrier type to comprise the PSS to have a second position in the PRB pair, the SSS to have a first position in the PRB pair, and the CRS to have a zero, third, seventh or tenth position in the PRB pair.

In the second method embodiment, the method may comprise sending the mapped PRB pair in multiple subframes of the radio frame.

In one embodiment, a communications device may be arranged to perform any of the above methods.

In one embodiment, at least one machine readable medium may comprise a plurality of instructions that in response to being executed on a computing device, cause the computing device to carry out any of the above methods.

In one embodiment, an apparatus to manage heterogeneous carriers for a wireless network may comprise means for performing any of the above methods.

In a second evolved node B (eNB) embodiment, the eNB may comprise circuitry, a resource mapper component for execution on the circuitry to map a synchronization signal (SS) and a cell-specific reference signal (CRS) to multiple physical resource block (PRB) pairs according to a physical signal pattern for a first carrier type, the physical signal pattern for the first carrier type to have a same number of defined positions between the SS and the CRS within the PRB pair as a physical signal pattern for a second carrier type, and a radio-frequency (RF) transceiver coupled to the circuitry, the RF transceiver to transmit electromagnetic signals representing a radio frame over a downlink channel of a long term evolution (LTE) system, the radio frame to comprise multiple subframes, with each of the multiple subframes to comprise one of the mapped PRB pairs.

In the second eNB embodiment, the PRB pair may comprise multiple orthogonal frequency-division multiplexing (OFDM) symbols.

In the second eNB embodiment, the SS may comprise a primary synchronization signal (PSS) or a secondary synchronization signal (SSS).

In the second eNB embodiment, the physical signal pattern of the second carrier type to comprise the PSS to have a sixth position in the PRB pair, the SSS to have a fifth position in the PRB pair, and the CRS to have a zero, fourth, seventh or eleventh position in the PRB pair.

In the second eNB embodiment, the physical signal pattern of the first carrier type to comprise the PSS to have a second position in the PRB pair, the SSS to have a first position in the PRB pair, and the CRS to have a zero, third, seventh or tenth position in the PRB pair.

In the second eNB embodiment, the resource mapper component may receive a scheduling pattern, the scheduling pattern to indicate which of the multiple subframes to comprise one of the mapped PRB pairs.

In the second eNB embodiment, the resource mapper component may receive a scheduling pattern using a radio resource control (RRC) protocol.

In the second eNB embodiment, the resource mapper component may generate a scheduling pattern based on a physical cell identifier (PCI) for the eNB.

In the second eNB embodiment, the eNB may further comprise an input device, a memory port, and an antenna.

The invention claimed is:

1. User Equipment (UE), comprising:
a processor circuit; and
a network control component for execution on the processor circuit to locate a synchronization signal (SS) and a cell-specific reference signal (CRS) in a physical resource block (PRB) pair of a long term evolution (LTE) network, the PRB pair having a physical signal pattern for a first carrier type, a time location of the SS according to the physical signal pattern for the first carrier type shifted relative to a time location of the SS according to a physical signal pattern for a second carrier type by a same number of defined positions as a number of defined positions of a shift in a time location of the CRS according to the physical signal pattern for the first carrier type relative to a time location of the CRS according to the physical signal pattern for the second carrier type.

2. The UE of claim 1, the SS to comprise a primary synchronization signal (PSS) or a secondary synchronization signal (SSS).

3. The UE of claim 1, the physical signal pattern of the second carrier type to comprise the PSS to have a sixth position in the PRB pair, the SSS to have a fifth position in the PRB pair, and the CRS to have a zero, fourth, seventh or eleventh position in the PRB pair.

4. The UE of claim 1, the physical signal pattern of the first carrier type to comprise the PSS to have a second position in the PRB pair, the SSS to have a first position in the PRB pair, and the CRS to have a zero, third, seventh or tenth position in the PRB pair.

5. The UE of claim 1, comprising a cell selection component for execution on the processor circuit to determine a reference signal received power (RSRP) parameter or a reference signal received quality (RSRQ) parameter from the CRS.

6. The UE of claim 1, comprising a handoff component for execution on the processor circuit to perform handoff operations based on a reference signal received power (RSRP) parameter or a reference signal received quality (RSRQ) parameter determined from the CRS.

7. The UE of claim 1, the radio frame to comprise multiple subframes, the SS and the CRS located within a same set of subframes of the radio frame.

8. The UE of claim 1, comprising a radio-frequency (RF) transceiver to receive electromagnetic signals representing a radio frame from a downlink channel of the LTE network, the radio frame to comprise a subframe with the PRB pair.

9. The UE of claim 1, comprising a touchscreen display, an input device, and an antenna.

10. A method, comprising:
receiving a radio frame at user equipment (UE) over a downlink channel of a long term evolution (LTE) network, the radio frame to comprise a subframe with a physical resource block (PRB) pair, the PRB pair to have a physical signal pattern of a first carrier type or a physical signal pattern of a second carrier type, a time location of a synchronization signal (SS) according to the physical signal pattern of the first carrier type shifted relative to a time location of the SS according to the physical signal pattern of the second carrier type by a same number of defined positions as a number of defined positions of a shift in a time location of the CRS according to the physical signal pattern of the first carrier type relative to a time location of the CRS according to the physical signal pattern of the second carrier type;
searching for the SS within the PRB pair, the SS comprising a primary SS (PSS) or a secondary SS (SSS);
locating the CRS within the PRB pair based on the position of the SS; and
measuring a power level of the CRS.

11. The method of claim 10, the physical signal pattern of the second carrier type to comprise the PSS to have a sixth position in the PRB pair, the SSS to have a fifth position in the PRB pair, and the CRS to have a zero, fourth, seventh or eleventh position in the PRB pair.

12. The method of claim 10, the physical signal pattern of the first carrier type to comprise the PSS to have a second position in the PRB pair, the SSS to have a first position in the PRB pair, and the CRS to have a zero, third, seventh or tenth position in the PRB pair.

13. The method of claim 10, comprising determining a reference signal received power (RSRP) parameter or a reference signal received quality (RSRQ) parameter from the measured power level of the CRS.

14. The method of claim 10, comprising selecting a macro node cell or a micro node cell based on a reference signal received power (RSRP) parameter or a reference signal received quality (RSRQ) parameter derived from the measured power level of the CRS.

15. The method of claim 10, comprising performing handoff operations based on a reference signal received power (RSRP) parameter or a reference signal received quality (RSRQ) parameter determined from the measured power level of the CRS.

16. An evolved node B (eNB), comprising:
circuitry; and
a resource mapper component for execution on the circuitry to map a synchronization signal (SS) and a cell-specific reference signal (CRS) to a physical resource block (PRB) pair according to a physical signal pattern for a first carrier type, a time location of the SS according to the physical signal pattern for the first carrier type shifted relative to a time location of the SS according to a physical signal pattern for a second carrier type by a same number of defined positions as a number of defined positions of a shift in a time location of the CRS according to the physical signal pattern for the first carrier type relative to a time location of the CRS according to the physical signal pattern for the second carrier type.

17. The eNB of claim 16, the PRB pair to comprise multiple orthogonal frequency-division multiplexing (OFDM) symbols.

18. The eNB of claim 16, the SS to comprise a primary synchronization signal (PSS) or a secondary synchronization signal (SSS).

19. The eNB of claim 16, the physical signal pattern of the second carrier type to comprise the PSS to have a sixth position in the PRB pair, the SSS to have a fifth position in the PRB pair, and the CRS to have a zero, fourth, seventh or eleventh position in the PRB pair.

20. The eNB of claim 16, the physical signal pattern of the first carrier type to comprise the PSS to have a second position in the PRB pair, the SSS to have a first position in the PRB pair, and the CRS to have a zero, third, seventh or tenth position in the PRB pair.

21. The eNB of claim 16, comprising a radio-frequency (RF) transceiver to transmit electromagnetic signals representing a radio frame over a downlink channel of a long term evolution (LTE) network, the radio frame to comprise multiple subframes, with one of the subframes to comprise the PRB pair.

22. The eNB of claim 16, the resource mapper component to map a SS and a CRS within a same set of subframes of a radio frame.

23. The eNB of claim 16, comprising an input device, a memory port, and an antenna.

\* \* \* \* \*